(12) United States Patent
Takemoto et al.

(10) Patent No.: US 6,605,686 B2
(45) Date of Patent: Aug. 12, 2003

(54) METHOD FOR PRODUCING AN AROMATIC POLYCARBONATE AND METHOD OF KEEPING RAW MATERIALS THEREOF

(75) Inventors: Hidemi Takemoto, Iwakuni (JP); Toru Sawaki, Iwakuni (JP); Keiichi Kaneko, Iwakuni (JP); Katsushi Sasaki, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/088,141

(22) PCT Filed: Jul. 13, 2001

(86) PCT No.: PCT/JP01/06090

§ 371 (c)(1),
(2), (4) Date: Mar. 15, 2002

(87) PCT Pub. No.: WO02/06374

PCT Pub. Date: Jan. 24, 2002

(65) Prior Publication Data

US 2002/0183477 A1 Dec. 5, 2002

(30) Foreign Application Priority Data

Jul. 18, 2000 (JP) .......................................... 2000-217436
Jul. 24, 2000 (JP) .......................................... 2000-221983

(51) Int. Cl.$^7$ ............................................. C08G 64/00
(52) U.S. Cl. ....................................... 528/196; 528/198
(58) Field of Search .................................. 528/196, 198; 526/59

(56) References Cited

U.S. PATENT DOCUMENTS 5,668,202 A * 9/1997 Hirata et al. ................. 524/154

FOREIGN PATENT DOCUMENTS

| JP | 6-32886 A | 2/1994 |
| JP | 6-32887 A | 2/1994 |
| JP | 7-26010 A | 1/1995 |
| JP | 8-157587 | 6/1996 |
| JP | 8-157587 A | 6/1996 |

OTHER PUBLICATIONS

International Search Report.

* cited by examiner

Primary Examiner—Terressa M. Boykin
(74) Attorney, Agent, or Firm—Sughrue Mion, PLLC

(57) ABSTRACT

An aromatic polycarbonate having excellent color is obtained by keeping an aromatic dihydroxy compound and a carbonic acid diester which are raw materials for the production of an aromatic polycarbonate in consideration of the influences of storage atmosphere, temperature, temperature difference from a storage tank and residence time.

24 Claims, No Drawings

US 6,605,686 B2

METHOD FOR PRODUCING AN AROMATIC POLYCARBONATE AND METHOD OF KEEPING RAW MATERIALS THEREOF

FIELD OF THE INVENTION

The present invention relates to a method of keeping raw materials used for the production of an aromatic polycarbonate and to a method of producing an aromatic polycarbonate having excellent color from the raw materials kept by the method.

DESCRIPTION OF THE PRIOR ART

A polycarbonate resin obtained by interfacial polycondensation between bisphenol A and phosgene is widely used for various purposes, for example, electric and electronic parts, optical parts and auto parts thanks to its excellent mechanical properties and thermal properties. However, it involves a safety problem because phosgene which is toxic is used and also an environmental destruction problem because methylene chloride is used as a solvent. In addition, a chlorine component derived from methylene chloride and sodium chloride which is a by-product corrodes a metal when a part is molded because it remains in the polycarbonate. Then, a polycarbonate produced by an ester exchange method which eliminates use of methylene chloride and phosgene has recently been attracting much attention. However, since the polycarbonate obtained by the ester exchange method receives long-time heat history at a high temperature, it is difficult to obtain a high-quality polycarbonate due to deterioration in color or the like. Particularly, in a polycarbonate recently applied to optical uses such as DVD, MO and CDR which are required to have high density and high accuracy, discoloration caused by insufficient thermal stability and gelation caused by thermal deformation have a direct influence upon the optical properties such as block error rate and the mechanical properties such as tensile properties, flexural properties and toughness of the final product. Therefore, further improvement of color and thermal stability of the polycarbonate produced by the ester exchange method has been desired.

To solve these problems, German Patent Publication No. 2439552 proposes a new method in which purified bisphenol A and diphenyl carbonate are supplied in a molar ratio of 30/70 to 70/30, preferably 45/55 to 55/45, kept in a uniformly molten state, charged into an ester exchange reactor and polymerized. JP-A 6-32885 (the term "JP-A" as used herein means an "unexamined published Japanese patent application") discloses the production of a polycarbonate by using an ester exchange reactor made from a metal material containing a metal selected from Fe, Cr, Mo, Ni, Cu and Cr and maintaining the amount of water in the reactor at 500 ppm or less to minimize the amount of the residual metal contained in the polycarbonate.

JP-A 6-32886 discloses an aromatic polycarbonate production method comprising purifying an aromatic dihydroxy compound, melting it, supplying it into a reactor substantially in the absence of oxygen without solidifying it and mixing it with a carbonic acid diester to carry out a polycondensation reaction.

JP-A 6-32887 discloses an aromatic polycarbonate production method comprising mixing a powdery aromatic dihydroxy compound with a molten carbonic acid diester substantially in the absence of oxygen and subjecting the resulting solution to a polycondensation reaction.

JP-A 7-26010 discloses a method for carrying out an ester exchange reaction between a dihydroxy compound and a carbonic acid diester in an atmosphere with an oxygen content of 2 ppm or less.

However, an aromatic polycarbonate having excellent color could not be obtained by any one of the above methods.

SUMMARY OF THE INVENTION

It is an object of the present invention to provide methods of keeping raw materials, which are effective for the production of an aromatic polycarbonate having excellent color.

It is another object of the present invention to provide methods of keeping raw materials in consideration of various parameters for keeping the raw materials and relation among the parameters which influence the color of an aromatic polycarbonate to be produced.

It is still another object of the present invention to provide a method of producing an aromatic polycarbonate having excellent color from raw materials kept by the methods of the present invention.

Other objects and advantages of the present invention will become apparent from the following description.

According to the present invention, firstly, the above objects and advantages of the present invention are attained by a method of keeping a mixture of an aromatic dihydroxy compound and a carbonic acid diester, comprising keeping a mixture consisting essentially of an aromatic dihydroxy compound and a carbonic acid diester in a molten state under the condition that the melt keeping parameter ($A_0$) defined by the following equation (1):

$$A_0 = -7.88 + 0.179 \times \log C_0 + 3.354 \times \log T_0 + 0.0078 \times U_0 + 0.0017 \tau_0 \quad (1)$$

wherein $C_0$ is the content (ppm) of oxygen in the atmosphere of a storage tank, $T_0$ is the temperature (° C.) of the molten mixture in the storage tank, $U_0$ is a temperature difference (° C.) between the heating medium of the storage tank and the molten mixture, and $\tau_0$ is the average residence time (hr) of the molten mixture in the storage tank, is 0 or less (may be referred to as "raw material mixture melt keeping method" hereinafter).

According to the present invention, secondly, the above objects and advantages of the present invention are attained by a method of keeping a carbonic acid diester, comprising keeping the carbonic acid diester in a molten state under the condition that the melt keeping parameter ($A_1$) defined by the following equation (2):

$$A_1 = -8.08 + 0.145 \times \log C_1 + 3.35 \times \log T_1 + 0.007 \times U_1 + 0.0007 \tau_1 \quad (2)$$

wherein $C_1$ is the content (ppm) of oxygen in the atmosphere of a storage tank, $T_1$ is the temperature (° C.) of the carbonic acid diester in the storage tank, $U_1$ is a temperature difference (° C.) between the heating medium of the storage tank and the carbonic acid diester, and $\tau_1$ is the average residence time (hr) of the carbonic acid diester in the storage tank, is 0 or less (may be referred to as "carbonic acid diester melt keeping method" hereinafter).

According to the present invention, thirdly, the above objects and advantages of the present invention are attained by a method of keeping a carbonic acid diester, comprising keeping the carbonic acid diester in a powder state under the condition that the powder keeping parameter ($B_2$) defined by the following equation (3):

$$B_2 = -0.425 + 0.131 \times \log C_3 + 0.047 \times \log M_2 - 0.0012 T_3 + 0.0017 \times \tau_3 \quad (3)$$

wherein $C_3$ is the content (ppm) of oxygen in the atmosphere of a storage tank, $M_2$ is the water content (ppm) of the carbonic acid diester in the storage tank, $T_3$ is the temperature (° C.) of the carbonic acid diester in the storage tank, and $\tau_3$ is the average residence time (hr) of the carbonic acid diester in the storage tank, is 0 or less (may be referred to as "carbonic acid diester powder keeping method" hereinafter).

According to the present invention, in the fourth place, the above objects and advantages of the present invention are attained by a method of keeping an aromatic dihydroxy compound, comprising keeping the aromatic dihydroxy compound in a powder state under the condition that the powder keeping parameter ($B_1$) defined by the following equation (4):

$$B_1=-0.425+0.131\times\log C_2+0.047\times\log M_1-0.0012\times T_2+0.0017\tau_2 \quad (4)$$

wherein $C_2$ is the content (ppm) of oxygen in the atmosphere of a storage tank, $M_1$ is the water content (ppm) of the aromatic dihydroxy compound in the storage tank, $T_2$ is the temperature (° C.) of the aromatic dihydroxy compound in the storage tank, and $\tau_2$ is the average residence time (hr) of the aromatic dihydroxy compound in the storage tank, is 0 or less (may be referred to as "aromatic dihydroxy compound powder keeping method" hereinafter).

Finally, according to the present invention, in the fifth place, the above objects and advantages of the present invention are attained by an aromatic polycarbonate production method comprising keeping an aromatic dihydroxy compound and a carbonic acid diester by using at least one of the above methods of the present invention, and subjecting a mixture thereof to an ester exchange reaction in the presence of a catalyst comprising a nitrogen-containing basic compound and at least one compound selected from an alkali metal compound and an alkaline earth metal compound.

THE PREFERRED EMBODIMENTS OF THE INVENTION

The methods of the present invention will be described hereinbelow. A description is first given of the method of keeping a raw material mixture in a molten state of the present invention.

The aromatic dihydroxy compound used is a compound having two hydroxy groups directly bonded to an aromatic ring.

Examples of the aromatic dihydroxy compound include bis(4-hydroxyaryl)alkanes such as bis(4-hydroxyphenyl) methane, 2,2-bis(4-hydroxyphenyl)propane (bisphenol A), 1,1-bis(4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)phenylmethane, 4,4'-dihydroxyphenyl-1,1'-m-diisopropylbenzene and 4,4'-dihydroxyphenyl-9,9-fluorene; bis(hydroxyaryl)cycloalkanes such as 1,1-bis(4-hydroxyphenyl)cyclopentane, 1,1-bis(4-hydroxyphenyl) cyclohexane, 1,1-bis(4-hydroxyphenyl)-3,3,5-trimethylcyclohexane, 1-methyl-1-(4-hydroxyphenyl)-4-(dimethyl-4-hydroxyphenyl)methyl-cyclohexane, 4-[1-[3-(4-hydroxyphenyl)-4-methylcyclohexyl]-1-methylethyl]-phenol, 4,4'-[1-methyl-4-(1-methylethyl)-1,3-cyclohexanediyl] bisphenol, 9,9-bis(4-hydroxy-3-methylphenyl)fluorene and 2,2,2',2'-tetrahydro-3,3,3',3'-tetramethyl-1,1'-spirobis -[1H-indene]-6,6'-diol; dihydroxyaryl ethers such as bis(4-hydroxyphenyl)ether, bis(4-hydroxy-3,5-dichlorophenyl)ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiaryl isatins such as 4,4'-dihydroxydiphenyl-3,3'-isatin; dihydroxydiaryl xanthenes such as 3,6-dihydroxy-9,9-dimethyl xanthene; dihydroxybenzenes such as resorcin, 3-methylresorcin, 3-ethylresorcin, 3-butylresorcin, 3-t-butylresorcin, 3-phenylresorcin, 3-cumylresorcin, hydroquinone, 2-methylhydroquinone, 2-ethylhydroquinone, 2-butylhydroquinone, 2-t-butylhydroquinone, 2-phenylhydroquinone and 2-cumylhydroquinone; and dihydroxydiphenyls such as 4,4'-dihydroxydiphenyl and 3,3'-dichloro-4,4'-dihydroxydiphenyl.

Out of these, 2,2-bis(4-hydroxyphenyl)propane (bisphenol A) is preferred because it has stability as a monomer and a low total content of impurities and can be acquired easily.

Examples of the carbonic acid diester include diphenyl carbonate, ditolyl carbonate, bis(chlorophenyl)carbonate, m-cresyl carbonate, dinaphthyl carbonate, bis(diphenyl) carbonate, dimethyl carbonate, diethyl carbonate, dibutyl carbonate and dicyclohexyl carbonate. Out of these, diphenyl carbonate is particularly preferred.

According to the mixture melt keeping method of the present invention, a molten mixture of the above aromatic dihydroxy compound and the above carbonic acid diester, preferably a molten mixture containing 1 mol of the aromatic dihydroxy compound and 1.0 to 1.2 mols of the carbonic acid diester is kept in a molten state under the condition that the melt keeping parameter ($A_0$) defined by the following equation (1):

$$A_0=-7.88+0.179\times\log C_0+3.354\times\log T_0+0.0078\times U_0+0.0017\tau_0 \quad (1)$$

wherein $C_0$ is the content (ppm) of oxygen in the atmosphere of a storage tank, $T_0$ is the temperature (° C.) of the molten mixture in the storage tank, $U_0$ is a temperature difference (° C.) between the heating medium of the storage tank and the molten mixture, and $\tau_0$ is the average residence time (hr) of the molten mixture in the storage tank, is 0 or less.

A polycarbonate having excellent color can be produced by employing a melt keeping under the condition that the melt keeping parameter $A_0$ is 0 or less, that is, 0 or a negative value. When the melt keeping parameter $A_0$ exceeds 0, a polycarbonate which is markedly inferior in color is obtained disadvantageously. More preferably, the molten mixture is kept under the condition that the melt keeping parameter AO is in the range of −0.6 to −0.001.

The color quality of the obtained polycarbonate is judged based on a "b" value which is used as an index of yellowness obtained by measuring the "Lab" value of a pellet (measuring 2.5 (short diameter)×3.3 (long diameter)×3.0 (length) (mm)) of the polycarbonate. A polycarbonate produced by the conventional ester exchange method is easily yellowed when it receives long-time heat history at a high temperature during polymerization or molding with the result that the "b" value of its pellet exceeds zero, thereby making it difficult to obtain a molded article for optical application where color is an important factor.

However, the present inventor has disclosed that a pellet having a "b" value of 0 or less can be produced by the production of an aromatic polycarbonate from a molten mixture kept by the above method of the present invention as a raw material.

In the above equation (1), $C_0$ is the content of oxygen in the atmosphere of the storage tank, which is preferably low to maintain the melt keeping parameter $A_0$ at zero or less so as to reduce the influence upon discoloration of an oxidation reaction in the storage tank. To this end, it is preferred that the inside of the storage tank should be fully substituted with an inert gas such as nitrogen or helium having a low content of oxygen and further that the molten mixture should be bubbled with an inert gas or let pass through an oxygen scavenger to remove a trace amount of oxygen contained in the raw material as required.

$T_0$, $U_0$ and $\tau_0$ are the temperature of the molten mixture, a temperature difference between the molten mixture and the heating medium and the average residence time of the mixture in the storage tank, respectively. All of them are preferably as small in value as possible to suppress heat history and an oxidation reaction under melting. To eliminate local temperature variations and residence time variations, the inside of the storage tank is preferably always stirred and mixed.

The temperature of the molten mixture in the storage tank is not particularly limited if the molten mixture can be stored stably and transferred easily in a liquid form but it is higher than a temperature at which crystals first separate out (crystallization temperature) and lower than 300° C. when the temperature is falling, preferably (crystallization temperature+1)° C. to 220° C., more preferably (crystallization temperature+1)° C. to 200° C. For example, in the case of an equimolar mixture of bisphenol A and diphenyl carbonate, it is approximately 125° C.

The inventor of the present invention has analyzed the degree of contribution of each of factors which are these conditions to the "b" value of the produced polycarbonate and has obtained the above equation (1). Since these conditions have an influence upon the color of the produced polycarbonate, the above measurement is preferably continued as long as possible right before the start of polymerization to maintain the melt keeping parameter $A_0$ at zero or less.

The above molten mixture to be kept is preferably a mixture containing substantially no ester exchange catalyst between the aromatic dihydroxy compound and the carbonic acid diester while it is kept. If the molten mixture contains an ester exchange catalyst, an aromatic monohydroxy compound will be by-produced, thereby reducing the accuracy of the equation of the melt keeping parameter.

The above molten mixture keeping method of the present invention provides a particularly marked effect when the melt keeping time exceeds 2 hours.

The melt storage tank is desirably made of a material having corrosion resistance against the molten mixture. Examples of the material include stainless steel such as SUS304, SUS304L, SUS316, SUS316L, SUS630, SCS13, SCS14, SCS16 and SCS19; and HCr (hard chromium), nickel plating, deposited stellite and carbon steel lined by HIP (hot isothermal press). Stainless steel is particularly preferred. The pipe and pipe joint of the melt storage tank are preferably made of the same material. The material of the storage tank may differ from the material of the pipe and the pipe joint but it is preferably the same to reduce the influence of thermal expansion from the viewpoints of the strength of the pipe and a dead space. A material which has been subjected to a heat treatment is preferred as the material of the pipe in consideration of the influence of stress at a high temperature.

The melt storage tank is not limited to a particular type and may be a generally known vertical mixer or horizontal mixer equipped with a stirrer, for heating with a heating medium. Out of these, a vertical batch type mixer is preferred.

Researches conducted by the present inventor(s) have revealed that an aromatic polycarbonate having excellent color can be produced by a method of keeping an aromatic dihydroxy compound or a carbonic acid diester separately under an appropriate condition as an alternative to the above method of keeping a mixture of an aromatic dihydroxy compound and a carbonic acid diester in a molten state. A description is subsequently given of this method. This method includes a method of keeping a carbonic acid diester in a molten state or powder state and a method of keeping an aromatic dihydroxy compound in a powder state.

According to the method of keeping a carbonic acid diester in a molten state, the carbonic acid diester is kept in a molten state under the condition that the melt keeping parameter ($A_1$) defined by the following equation (2):

$$A_1 = -8.08 + 0.145 \times \log C_1 + 3.35 \times \log T_1 + 0.007 \times U_1 + 0.0007 \tau_1 \quad (2)$$

wherein $C_1$ is the content (ppm) of oxygen in the atmosphere of a storage tank, $T_1$ is the temperature (° C.) of the carbonic acid diester in the storage tank, $U_1$ is a temperature difference (° C.) between the heating medium of the storage tank and the carbonic acid diester, and $\tau_1$ is the average residence time (hr) of the carbonic acid diester in the storage tank, is 0 or less.

The melt keeping parameter $A_1$ is more preferably in the range of −1.6 to −0.001.

In the above equation (1), $C_1$ is the content of oxygen in the atmosphere of the storage tank, which is preferably low to maintain the melt keeping parameter $A_1$ at zero or less so as to reduce the influence upon discoloration of an oxidation reaction in the storage tank. To this end, it is preferred that the inside of the storage tank should be fully substituted with an inert gas such as nitrogen or helium having a low content of oxygen and further that the molten carbonic acid diester should be bubbled with an inert gas or let pass through an oxygen scavenger to remove a trace amount of oxygen contained in the raw material as required.

$T_1$, $U_1$ and $\tau_1$ are the temperature of the molten carbonic acid diester, a temperature difference between the molten carbonic acid diester and the heating medium and the average residence time of the molten carbonic acid diester in the storage tank, respectively. All of them are preferably as small in value as possible to suppress heat history and an oxidation reaction under melting. To eliminate local temperature variations and residence time variations, the inside of the storage tank is preferably always stirred and mixed.

The temperature of the molten carbonic acid diester in the storage tank is preferably the melting point of the carbonic acid diester to 250° C., more preferably the melting point of the carbonic acid diester to 200° C.

Examples of the carbonic acid diester to be kept in a molten state are the same as those enumerated for the raw material mixture melt keeping method. Out of these, diphenyl carbonate is preferred.

According to the method of keeping a carbonic acid diester in a powder state, the carbonic acid diester is kept in a powder state under the condition that the powder keeping parameter ($B_2$) defined by the following equation (3):

$$B_2 = -0.425 + 0.131 \times \log C_3 + 0.047 \times \log M_2 - 0.0012 T_3 + 0.0017 \times \tau_3 \quad (3)$$

wherein $C_3$ is the content (ppm) of oxygen in the atmosphere of a storage tank, $M_2$ is the water content (ppm) of the carbonic acid diester in the storage tank, $T_3$ is the temperature (° C.) of the carbonic acid diester in the storage tank, and $\tau_3$ is the average residence time (hr) of the carbonic acid diester in the storage tank, is 0 or less.

The powder keeping parameter ($B_2$) is more preferably in the range of −0.7 to −0.0001.

In the above equation (3), $C_3$ is the content of oxygen in the atmosphere of the storage tank, which is preferably low to reduce the powder keeping parameter $B_2$ so as to suppress the influence upon discoloration of an oxidation reaction in the storage tank. To this end, it is preferred that the inside of the storage tank should be fully substituted with an inert gas such as nitrogen or helium having a low content of oxygen.

$M_2$ is the water content of the carbonic acid diester in the storage tank. The presence of water promotes the hydrolysis of raw materials, an oligomer and a polymer in a polymerizer and the formation of a component causing discoloration by hydrolysis. Therefore, the water content is preferably as low as possible.

$T_3$ is the temperature of the carbonic acid diester powder in the storage tank. A higher temperature for keeping the powder is more preferred because the powder keeping parameter $B_2$ can be kept small in value.

$\tau_3$ is the average residence time of the carbonic acid diester in the storage tank. A shorter average residence time is more preferred to keep the powder keeping parameter $B_2$ small in value so as to prevent entry of a substance having a bad influence upon color while the carbonic acid diester is kept in the storage tank.

To eliminate local temperature variations and residence time variations, the inside of the storage tank is preferably always stirred and mixed. It is also preferred that right before the carbonic acid diester is charged into the polymerizer, it should be kept in the storage tank and that the water content, oxygen content and powder temperature thereof should be always measured and recorded to confirm that the powder keeping parameter $B_2$ is zero or less.

The temperature of the carbonic acid diester in the storage tank is preferably −50° C. or more and less than the melting point of the carbonic acid diester, more preferably −30° C. to 50° C.

Examples of the carbonic acid diester to be kept in a powder state are the same as those enumerated for the raw material mixture melt keeping method. Out of these, diphenyl carbonate is preferred.

Further, according to the method of keeping the aromatic dihydroxy compound in a powder state, the aromatic dihydroxy compound is kept in a powder state under the condition that the powder keeping parameter ($B_1$) defined by the following equation (4):

$$B_1 = -0.425 + 0.131 \times \log C_2 + 0.047 \times \log M_1 - 0.0012 \times T_2 + 0.0017\tau_2 \quad (4)$$

wherein $C_2$ is the content (ppm) of oxygen in the atmosphere of a storage tank, $M_1$ is the water content (ppm) of the aromatic dihydroxy compound in the storage tank, $T_2$ is the temperature (° C.) of the aromatic dihydroxy compound in the storage tank, and $\tau_2$ is the average residence time (hr) of the aromatic dihydroxy compound in the storage tank, is 0 or less.

The powder keeping parameter ($B_1$) is more preferably in the range of −0.7 to −0.0001.

In the above equation (4), $C_2$ is the content of oxygen in the atmosphere of the storage tank, which is preferably low to reduce the powder keeping parameter $B_1$ so as to suppress the influence upon discoloration of an oxidation reaction in the storage tank. To this end, it is preferred that the inside of the storage tank should be fully substituted with an inert gas such as nitrogen or helium having a low content of oxygen.

$M_1$ is the water content of the aromatic dihydroxy compound in the storage tank. The presence of water promotes the hydrolysis of raw materials, an oligomer and a polymer in the polymerizer and the formation of a component causing discoloration by hydrolysis. Therefore, the water content is preferably as low as possible.

$T_2$ is the temperature of the aromatic dihydroxy compound powder in the storage tank. A higher temperature for keeping the powder is more preferred because the powder keeping parameter $B_1$ can be kept small in value.

$\tau_2$ is the average residence time of the aromatic dihydroxy compound in the storage tank. A shorter average residence time is more preferred to keep the powder keeping parameter $B_1$ small in value so as to prevent entry of a substance having a bad influence upon color while the aromatic dihydroxy compound is kept in the storage tank.

To eliminate local temperature variations and residence time variations, the inside of the tank is preferably always stirred and mixed. It is also preferred that right before the aromatic dihydroxy compound is charged into the polymerizer, it should be kept in the storage tank and that the water content, oxygen content and powder temperature thereof should be always measured and recorded to confirm that the powder keeping parameter $B_1$ is zero or less.

The temperature of the aromatic dihydroxy compound powder in the storage tank is preferably −50° C. or more and less than the melting point of the aromatic dihydroxy compound, more preferably −30 to 50° C.

Examples of the aromatic dihydroxy compound to be kept in a powder state are the same as those enumerated for the raw material mixture melt keeping method. Out of these, 2,2-bis(4-hydroxyphenyl)propane is preferred.

What is not described of the above carbonic acid diester melt keeping method, carbonic acid diester powder keeping method and aromatic dihydroxy compound powder keeping method, it should be understood that a description of the raw material mixture melt keeping method be applied directly or with facts obvious to one of ordinary skill in the art.

Preferred embodiments of the above raw material mixture melt keeping method of the present invention are:

(a) a method using an aromatic dihydroxy compound kept by the aromatic dihydroxy compound powder keeping method;

(b) a method using a carbonic acid diester kept by the carbonic acid diester powder keeping method, and (c) a method using a carbonic acid diester kept by the carbonic acid diester melt keeping method.

A polycarbonate having more excellent color, that is, a negative "b" value can be produced by preparing an aromatic polycarbonate from a molten raw material mixture kept by the above preferred embodiments as a raw material.

A description is subsequently given of the aromatic polycarbonate production method of the present invention.

In the aromatic polycarbonate production method of the present invention, at least one of an aromatic dihydroxy compound and a carbonic acid diester which has been kept as a raw material by at least one of the above keeping methods of the present invention is used.

More specifically, (i) a method using a mixture of an aromatic dihydroxy compound and a carbonic acid diester kept by the raw material mixture melt keeping method, (ii) a method using an aromatic dihydroxy compound kept by the aromatic dihydroxy compound powder keeping method, (iii) a method using a carbonic acid diester kept by the carbonic acid diester powder keeping method, or (iv) a method using a carbonic acid diester kept by the carbonic acid diester melt keeping method is used. A combination of the above methods (ii) and (iii) and a combination of the methods (ii) and (iv) are preferred embodiments of the above method (ii).

The aromatic polycarbonate production method of the present invention is characterized by use of a raw material kept by at least one of the keeping methods of the present invention as described above. The raw material mixture is subjected to an ester exchange reaction in the presence of a catalyst which comprises a nitrogen-containing basic compound and at least one compound selected from the group consisting of an alkali metal compound and an alkaline earth metal compound.

The alkali metal compound is a hydroxide, bicarbonate, carbonate, acetate, nitrate, nitrite, sulfite, cyanate, thiocyanate, stearate, borohydride, benzoate, hydrogenphosphate, bisphenol or phenol salt of an alkali metal.

Preferred examples of the alkali metal compound include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassiumsulfite, lithiumsulfite, sodiumcyanate, potassium cyanate, lithium cyanate, sodium thiocyanate, potassium thiocyanate, lithium thiocyanate, sodium stearate, potassium stearate, lithium stearate, sodium borohydride, potassium borohydride, lithium borohydride, sodium phenylborate, potassium phenylborate, lithium phenylborate, sodium benzoate, potassium benzoate, lithium benzoate, disodium hydrogenphosphate, dipotassiumhydrogenphosphate, dilithium hydrogenphosphate, disodium salts, dipotassium salts and dilithium salts of bisphenol A, and sodium salts, potassium salts and lithium salts of phenol. Out of these, disodium salts of bisphenol A and sodium salts of phenol are particularly preferred.

The alkaline earth metal compound is a hydroxide, bicarbonate, carbonate, acetate, nitrate, nitrite, sulfite, cyanate, thiocyanate, stearate, benzoate, bisphenolorphenol salt of an alkaline earth metal.

Specific examples of the alkaline earth metal compound include calcium hydroxide, barium hydroxide, strontium hydroxide, calcium bicarbonate, barium bicarbonate, strontium bicarbonate, calcium carbonate, barium carbonate, strontium carbonate, calcium acetate, barium acetate, strontiumacetate, calciumnitrate, bariumnitrate, strontium nitrate, calcium nitrite, barium nitrite, strontium nitrite, calcium sulfite, barium sulfite, strontium sulfite, calcium cyanate, barium cyanate, strontium cyanate, calcium thiocyanate, barium thiocyanate, strontium thiocyanate, calcium stearate, barium stearate, strontium stearate, calcium borohydride, barium borohydride, strontium borohydride, calcium benzoate, barium benzoate, strontium benzoate, calcium salts, barium salts and strontium salts of bisphenol A, and calcium salts, barium salts and strontium salts of phenol.

In the present invention, (a) an alkali metal salt of an ate complex of a group XIV element of the periodic table or (b) an alkali metal salt of an oxoacid of a group XIV element of the periodic table may be optionally used as the alkali metal compound of the catalyst. The group XIV element of the periodic table is silicon, germanium or tin.

Using the alkali metal compound as a polycondensation reaction catalyst, a polycondensation reaction can proceed completely and quickly. Also, an undesirable side reaction such as a branching reaction which occurs during the polycondensation reaction can be suppressed to a low level.

Examples of the alkali metal salt of the ate complex of the group XIV element of the periodic table (a) enumerated in JP-A 7-268091 are preferably used. Specifically, germanium (Ge) compounds include $NaGe(OMe)_5$, $NaGe(OEt)_3$, $NaGe(OPr)_5$, $NaGe(OBu)_5$, $NaGe(OPh)_5$, $LiGe(OMe)_5$, $LiGe(OBu)_5$ and $LiGe(OPh)_5$.

Tin (Sn) compounds include $NaSn(OMe)_3$, $NaSn(OMe)_2(OEt)$, $NaSn(OEt)_3$, $NaSn(OPr)_3$, $NaSn(O\text{-}n\text{-}C_6H_{13})_3$, $NaSn(OMe)_5$, $NaSn(OEt)_5$, $NaSn(OBu)_5$, $NaSn(O\text{-}n\text{-}C_{12}H_{25})_5$, $NaSn(OPh)_5$ and $NaSnBu_2(OMe)_3$.

Preferred examples of the alkali metal salt of the oxoacid of the group XIV element of the periodic table (b) include alkali metal salts of silicic acid, stannic acid, germanium(II) acid (germanous acid) and germanium(IV) acid (germanic acid).

The alkali metal salt of silicic acid is, for example, an acidic or neutral alkali metal salt of monosilicic acid or a condensate thereof, as exemplified by monosodium orthosilicate, disodium orthosilicate, trisodium orthosilicate and tetrasodium orthosilicate.

The alkali metal salt of stannic acid is, for example, an acidic or neutral alkali metal salt of monostannic acid or a condensate thereof, as exemplified by disodium monostannate ($Na_2SnO_3 \cdot xH_2O$, x=0 to 5) and tetrasodium monostannate ($Na_4SnO_4$).

The alkali metal salt of germanium(II) acid (germanous acid) is, for example, an acidic or neutral alkali metal salt of monogermanous acid or a condensate thereof, as exemplified by monosodium germanate ($NaHGeO_2$).

The alkali metal salt of germanium(IV) acid (germanic acid) is, for example, an acidic or neutral alkali metal salt of monogermanium(IV) acid or a condensate thereof, as exemplified by monolithium orthogermanate ($LiH_3GeO_4$), disodium orthogermanate, tetrasodium orthogermanate, disodium digermanate ($Na_2Ge_2O_5$) and disodium tetragermanate ($Na_2Ge_5O_{11}$).

The alkali metal compound or alkaline earth metal compound as described above is preferably used in an amount of $1 \times 10^{-8}$ to $5 \times 10^{-5}$ equivalent in terms of the alkali metal element or alkaline earth metal element contained in the catalyst based on 1 mol of the aromatic dihydroxy compound. The amount is more preferably $5 \times 10^{-7}$ to $1 \times 10^{-5}$ equivalent based on the same standard. When the amount of the alkali metal compound or alkaline earth metal compound is outside the above range, it may exert a bad influence upon the physical properties of the obtained polycarbonate or an ester exchange reaction does not proceed fully, thereby making it impossible to obtain a polycarbonate having a high molecular weight.

The equivalent of the alkali metal compound or alkaline earth metal compound as used herein means a product of the total number of valences of the alkali metal element or alkaline earth metal element contained in one molecule of the catalyst and the number of mols of the catalyst. When one alkali metal element (monovalent) is contained in one molecule of the catalyst, 1 mol of the catalyst is equal to 1 equivalent of the catalyst and when one alkaline earth metal element (divalent) is contained, 1 mol of the catalyst is equal to 2 equivalents of the catalyst. When two alkali metal elements (monovalent) are contained in one molecule of the catalyst, 1 mol of the catalyst is equal to 2 equivalents of the catalyst.

Examples of the nitrogen-containing basic compound used as the catalyst include ammonium hydroxides having an alkyl, aryl or alkylaryl group such as tetramethylammonium hydroxide (Me$_4$NOH), tetraethylammonium hydroxide (Et$_4$NOH), tetrabutylammonium hydroxide (Bu$_4$NOH), benzyltrimethylammonium hydroxide (φ-CH$_2$(Me)$_3$NOH) and hexadecyltrimethylammonium hydroxide; tertiary amines such as triethylamine, tributylamine, dimethylbenzylamine and hexadecyldimethylamine; and basic salts such as tetramethylammonium borohydride (Me$_4$NBH$_4$), tetrabutylammonium borohydride (Bu$_4$NBH$_4$), tetramethylammonium tetraphenylborate (Me$_4$NBPh$_4$) and tetrabutylammonium tetraphenylborate (Bu$_4$NBPh$_4$).

The above nitrogen-containing basic compound is preferably used in an amount of $1 \times 10^{-5}$ to $5 \times 10^{-3}$ equivalent in terms of the ammonia nitrogen atom contained in the nitrogen-containing basic compound based on 1 mol of the aromatic dihydroxy compound. The amount is more preferably $2 \times 10^{-5}$ to $5 \times 10^{-4}$ equivalent, particularly preferably $5 \times 10^{-5}$ to $5 \times 10^{-4}$ equivalent based on the same standard.

The equivalent of the catalyst of the nitrogen-containing basic compound as used herein means a product of the total number of valences of the nitrogen-containing basic compound contained in one molecule of the catalyst and the number of mols of the catalyst. When one basic nitrogen element (monovalent) is contained in one molecule of the catalyst, 1 mol of the catalyst is equal to 1 equivalent of the catalyst. For example, 1 mol of tetramethylammonium hydroxide (Me$_4$NOH) is equal to 1 equivalent of the catalyst.

At least one cocatalyst selected from the group consisting of an oxoacid of a group XIV element of the periodic table and an oxide of the same element may be used as required in combination with the above catalyst in the above polycondensation reaction.

Undesirable side reactions such as a branching reaction liable to occur during a polycondensation reaction and the generation of foreign matter or yellowish in a molding apparatus during molding can be more effectively suppressed without ill-affecting the terminal blocking reaction and polycondensation reaction rate by using these cocatalysts in specific ratios.

Examples of the oxoacid of the group XIV element of the periodic table include silicic acid, stannic acid and germanic acid.

Examples of the oxide of the group XIV element of the periodic table include silicon monoxide, silicon dioxide, tin monoxide, tin dioxide, germanium monoxide, germanium dioxide and condensates thereof.

The cocatalyst is preferably used in an amount of 50 mols (atoms) or less in terms of the group XIV metal element of the periodic table contained in the cocatalyst based on 1 mol (atom) of the alkali metal element contained in the polycondensation reaction catalyst. When the cocatalyst is used in an amount of more than 50 mols (atoms) in terms of the metal element, the polycondensation reaction rate slows down disadvantageously.

The cocatalyst is more preferably used in an amount of 0.1 to 30 mols (atoms) in terms of the group XIV metal element of the periodic table contained in the cocatalyst based on 1 mol (atom) of the alkali metal element contained in the polycondensation reaction catalyst.

These catalytic systems have an advantage that a polycondensation reaction and a terminal blocking reaction can proceed quickly and completely when they are used in the polycondensation reaction. Also, they can suppress an undesirable side reaction such as a branching reaction which occurs in a polycondensation reaction system to a low level.

For the production of an aromatic polycarbonate through an ester exchange reaction between an aromatic dihydroxy compound and a carbonic acid diester under heating and melting, the aromatic dihydroxy compound and the carbonic acid diester are heated and stirred in an inert gas atmosphere under normal pressure or reduced pressure, and the above catalyst is added to the obtained molten mixture to start an ester exchange reaction. At this point, the carbonic acid diester and the aromatic dihydroxy compound are used to ensure that an amount of the former is preferably 1.00 to 1.20 mols, more preferably 1.005 to 1.10 mols, much more preferably 1.01 to 1.05 mols based on 1 mol of the latter. An aliphatic diol such as ethylene glycol, 1,4-butanediol, 1,4-cyclohexane dimethanol or 1,10-decanediol, a dicarboxylic acid such as succinic acid, isophthalic acid, 2,6-naphthalenedicarboxylic acid, adipic acid, cyclohexanecarboxylic acid or terephthalic acid and an oxy acid such as lactic acid, p-hydroxybenzoic acid or 6-hydroxy-2-naphthoic acid may be optionally used.

The reaction temperature is generally 140 to 300° C. and preferably increased along with the proceeding of polymerization. Preferably, the pressure of the reaction system is reduced or a large amount of an inert gas is circulated to enable the formed phenol to be easily distilled out so as to promote the reaction.

The polycondensation reactor used to carry out the present invention is not limited to a particular type and a generally known vertical mixer, horizontal mixer, extruder and the like may be used.

More specifically, when the reaction is carried out in a batch manner, two vertical mixers are used. The aromatic dihydroxy compound and the carbonic acid diester are charged into the first mixer equipped with a fractionating column in the above molar ratio, the inside of the mixer is substituted with an inert gas, the above raw materials are heated to be molten, and the above polymerization catalyst is added in a predetermined amount and heated while the system is placed under vacuum to carry out the initial stage of polymerization, the reaction solution is transferred to the second mixer having no fractionating column, and the system is placed under higher vacuum and temperature of the system is further raised to continue polymerization until a predetermined degree of polymerization is achieved. At this point, the reaction can be carried out by adding an appropriate amount of the nitrogen-containing basic compound during the reaction in the first mixer or during the transfer of the reaction solution to the second mixer in order to maintain the concentration of the nitrogen-containing basic compound in the reaction system at the range of the present invention.

When the reaction is carried out in a continuous manner, a plurality of mixers are used. A vertical mixer equipped with a fractionating column is used as the first polymerizer in which the reaction product has a low viscosity, a horizontal mixer or double-screw extruder is used as subsequent polymerizers in which the viscosity of the reaction product increases and the removal of the by-produced aromatic monohydroxy compound becomes difficult, these polymerizers are arranged in series, the molten raw materials and catalyst are continuously supplied into the first polymerizer, and a polycarbonate having a predetermined degree of polymerization is continuously extracted from the final polymerizer. At this point, the reaction can be carried out by adding an appropriate amount of the nitrogen-containing basic compound to the first polymerizer and other polymerizers in order to maintain the concentration of the nitrogen-containing basic compound in the reaction system at the range of the present invention.

In the present invention, the above melt storage tank may be used as the vertical mixer for carrying out the initial stage of a polymerization reaction or separately from the vertical mixer.

A catalyst deactivator may be added to the polycarbonate obtained by the method of the present invention in the final polymerizer or after it is transferred from the final polymerizer. The catalyst deactivator greatly reduces the activity of the catalyst. As the deactivator for reducing the activity of an ester exchange polymerization catalyst used in the present invention may be used conventionally known agents as disclosed by JP-A 8-59975. Out of these, ammonium salts, phosphonium salts and esters of sulfonic acid are preferred.

Out of these, ammonium salts and phosphonium salts of sulfonic acid are more preferred, and ammonium salts and phosphonium salts of dodecylbenzenesulfonic acid such as tetrabutylphosphonium dodecylbenzenesulfonate and ammonium salts and phosphonium salts of paratoluenesulfonic acid such as tetrabutylammonium paratoluenesulfonate are much more preferred. Out of the sulfonic acid esters, methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate and phenyl paratoluenesulfonate are preferred. Out of these catalyst deactivators, tetrabutylphosphonium dodecylbenzenesulfonate and tetrabutylammonium paratoluenesulfonate are the most preferred in the present invention.

The catalyst deactivator used in the present invention may be added to the polycarbonate alone or as a mixed solution of it and water.

The amount of the catalyst deactivator added to the polycarbonate obtained by melt polymerization in the present invention is 0.5 to 50 equivalents, preferably 0.5 to 10 equivalents, more preferably 0.8 to 5 equivalents based on 1 equivalent of the above polycondensation catalyst selected from an alkali metal compound and an alkaline earth metal compound. The equivalent of the catalyst deactivator indicates the number of sites which can react with one of the valences of the catalytic metal existent in one molecule of the deactivator. As for the relationship between the mol and equivalent of the catalyst deactivator, when one reactive site is existent in one molecule of the deactivator, 1 mol is equal to 1 equivalent and when two reactive sites are existent, 1 mol is equal to 2 equivalents. This is generally equivalent to 0.01 to 500 ppm based on the polycarbonate resin.

The catalyst deactivator is added to and kneaded with a molten polycarbonate directly or in the form of a solution or dispersion in an appropriate solvent. Equipment for carrying out this operation is not limited to a particular type but a double-screw extruder or the like is preferred. When the catalyst deactivator is dissolved or dispersed in a solvent, a vented double-screw extruder is particularly preferably used.

Other additives may be added to the polycarbonate in limits not prejudicial to the object of the present invention. These additives are preferably added to the molten polycarbonate like the catalyst deactivator. The additives include a heat resistant stabilizer, epoxy compound, ultraviolet light absorber, release agent, colorant, slipping agent, antiblocking agent, lubricant, organic filler and inorganic filler.

Out of these, a heat resistant stabilizer, ultraviolet light absorber, release agent, colorant and the like are generally used and may be used in combination of two or more.

Examples of the heat resistant stabilizer used in the present invention include phosphorus compounds, phenol-based stabilizers, organic thioether-based stabilizers and hindered amine-based stabilizers.

General ultraviolet light absorbers are used as the ultraviolet light absorber, as exemplified by salicylic acid-based, benzophenone-based, benzotriazole-based and cyanoacrylate-based ultraviolet light absorbers.

Generally known release agents may be used as the release agent, as exemplified by hydrocarbon-based release agents such as a paraffin, fatty acid-based release agents such as stearic acid, fatty acid amide-based release agents such as stearamide, alcohol-based release agents such as stearyl alcohol and pentaerythritol, fatty acid ester-based release agents such as glycerol monostearate, and silicone-based release agents such as silicone oil.

Organic and inorganic pigments and dyes may be used as the colorant

Although the method of adding these additives is not particularly limited, they may be added to the polycarbonate directly or as a master pellet.

A solid filler and/or a thermoplastic resin other than the polycarbonate of the present invention may be further added to the polycarbonate prepared from the method of the present invention in limits not prejudicial to the object of the present invention in order to improve stiffness, thereby making it possible to provide a polycarbonate composition.

EXAMPLES

The following examples and comparative examples are provided for the purpose of further illustrating and exemplifying the present invention but are in no way to be taken as limiting. "ppm" and "parts" in the examples and comparative examples mean "ppm by weight" and "parts by weight", respectively, unless otherwise stated. The physical properties of raw materials and the obtained polycarbonates in the examples and comparative examples were measured as follows.

1) Content of Oxygen

The content of oxygen in nitrogen discharged from the storage tank for keeping a raw material in a molten state was measured with the OA-1 oxygen analyzer of Aichi Sangyo Co., Ltd.

2) Temperature

The temperatures of the molten mixed solution and the heating medium were measured with a generally commercially available thermocouple to calculate a temperature difference between them. The temperature of the heating medium is a temperature right before the heating medium is introduced into the jacket of the storage tank where the raw materials are molten and mixed together and the highest temperature required for maintaining the temperature of the molten mixture. The above oxygen content and temperature were measured from the start of melting to right before the start of polymerization. The temperature of a powder was measured with a generally commercially available thermocouple. The above oxygen content and temperature were measured from the start of storage to right before the start of polymerization.

3) Water Content

The amount of water contained in 10 g of an accurately weighed sample was measured with the CZA-3000 precision trace water meter of Chinoh Co., Ltd. to obtain the water content.

4) Viscosity Average Molecular Weight

The intrinsic viscosity of a methylene chloride solution having a concentration of 0.7 g/dl was measured with an Ubbellohde viscometer to obtain a viscosity average molecular weight from the following equation (II).

$$[\eta]=1.23\times10^{-4}\times Mw^{0.83} \tag{II}$$

(wherein $[\eta]$ is an intrinsic viscosity and Mw is a viscosity average molecular weight.)

5) Color ("b" Value)

The "Lab" value of a polycarbonate pellet (2.5 (short diameter)×3.3 (long diameter)×3.0 (length) mm) was measured with the ND-1001DP of Nippon Denshoku Kogyo Co., Ltd. in accordance with the reflection method and the "b" value was used as an index of yellowness.

Example 1

1,000 parts of bisphenol A and 960 parts of diphenyl carbonate were charged into a vertical batch type autoclave made of SUS316, equipped with a fractionating column, stirrer and jacket and connected to an oxygen analyzer, and a 135° C. heating medium was circulated in the jacket of the autoclave to adjust the temperature of the solution to 130° C. and keep that temperature for 10 hours while nitrogen whose oxygen content had been adjusted to 10 ppm was injected at a rate of 2 liters/min. At this point, the oxygen analyzer read 12 ppm and the $A_0$ value in the equation of the present invention was −0.541. Then $5\times10^{-7}$ equivalent of sodium phenoxide as a metal and $1\times10^{-4}$ equivalent of tetramethylammonium hydroxide as basic nitrogen were added based on 1 mol of bisphenol A, the pressure was reduced to 4.0 kPa (30 mmHg) over 1 hour under heating to 220° C., and this state was maintained for 1 hour to distill off most of phenol. The pressure was further reduced to 133 Pa (1 mmHg) over 1 hour under heating to 270° C. and a reaction was then carried out for 1 hour to obtain a polycarbonate having a viscosity average molecular weight of 15,200. The polycarbonate in a molten state was extruded from a die and pelletized by a pelletizer. The results are shown in Table 1.

Example 2

The procedure of Example 1 was repeated except that nitrogen whose oxygen content had been adjusted to 10 ppm was injected and a 185° C. heating medium was circulated to adjust the temperature of the solution to 180° C. and keep that temperature for 10 hours. At this point, the oxygen analyzer read 11 ppm and the $A_0$ value in the equation of the present invention was −0.073. The results are shown in Table 1.

Example 3

The procedure of Example 1 was repeated except that nitrogen whose oxygen content had been adjusted to 10 ppm was injected and a 140° C. heating medium was circulated to adjust the temperature of the solution to 130° C. and keep that temperature for 40 hours. At this point, the oxygen analyzer read 10 ppm and the $A_0$ value in the equation of the present invention was −0.465. The results are shown in Table 1.

Example 4

The procedure of Example 1 was repeated except that nitrogen whose oxygen content had been adjusted to 10 ppm was injected and a 170° C. heating medium was circulated to adjust the temperature of the solution to 160° C. and keep that temperature for 40 hours. At this point, the oxygen analyzer read 10 ppm and the $A_0$ value in the equation of the present invention was −0.162. The results are shown in Table 1.

Example 5

The procedure of Example 1 was repeated except that nitrogen whose oxygen content had been adjusted to 10 ppm was injected and a 160° C. heating medium was circulated to adjust the temperature of the solution to 130° C. and keep that temperature for 10 hours. At this point, the oxygen analyzer read 10 ppm and the $A_0$ value in the equation of the present invention was −0.360. The results are shown in Table 1.

Example 6

The procedure of Example 1 was repeated except that nitrogen whose oxygen content had been adjusted to 50 ppm was injected and a 135° C. heating medium was circulated to adjust the temperature of the solution to 130° C. and keep that temperature for 10 hours. At this point, the oxygen analyzer read 48 ppm and the $A_0$ value in the equation of the present invention was −0.433. The results are shown in Table 1.

Example 7

The procedure of Example 1 was repeated except that nitrogen whose oxygen content had been adjusted to 50 ppm was injected and a 140° C. heating medium was circulated to adjust the temperature of the solution to 130° C. and keep that temperature for 10 hours. At this point, the oxygen analyzer read 53 ppm and the $A_0$ value in the equation of the present invention was −0.386. The results are shown in Table 1.

Example 8

The procedure of Example 1 was repeated except that nitrogen whose oxygen content had been adjusted to 50 ppm was injected and a 160° C. heating medium was circulated to adjust the temperature of the solution to 130° C. and keep that temperature for 10 hours. At this point, the oxygen analyzer read 50 ppm and the $A_0$ value in the equation of the present invention was −0.235. The results are shown in Table 1.

Example 9

The procedure of Example 1 was repeated except that nitrogen whose oxygen content had been adjusted to 100 ppm was injected and a 135° C. heating medium was circulated to adjust the temperature of the solution to 130° C. and keep that temperature for 10 hours. At this point, the oxygen analyzer read 108 ppm and the $A_0$ value in the equation of the present invention was −0.370. The results are shown in Table 1.

Example 10

The procedure of Example 1 was repeated except that nitrogen whose oxygen content had been adjusted to 100 ppm was injected and a 140° C. heating medium was circulated to adjust the temperature of the solution to 130° C. and keep that temperature for 40 hours. At this point, the oxygen analyzer read 102 ppm and the $A_0$ value in the equation of the present invention was −0.284. The results are shown in Table 1.

Example 11

The procedure of Example 1 was repeated except that nitrogen whose oxygen content had been adjusted to 100 ppm was injected and a 160° C. heating medium was circulated to adjust the temperature of the solution to 130° C. and keep that temperature for 10 hours. At this point, the oxygen analyzer read 109 ppm and the $A_0$ value in the equation of the present invention was −0.174. The results are shown in Table 1.

17

Comparative Example 1

The procedure of Example 1 was repeated except that nitrogen whose oxygen content had been adjusted to 10 ppm was injected and a 190° C. heating medium was circulated to adjust the temperature of the solution to 180° C. and keep that temperature for 40 hours. At this point, the oxygen analyzer read 11 ppm and the $A_0$ value in the equation of the present invention was 0.017. The results are shown in Table 1.

Comparative Example 2

The procedure of Example 1 was repeated except that nitrogen whose oxygen content had been adjusted to 10 ppm was injected and a 210° C. heating medium was circulated to adjust the temperature of the solution to 180° C. and keep that temperature for 10 hours. At this point, the oxygen analyzer read 12 ppm and the $A_0$ value in the equation of the present invention was 0.128. The results are shown in Table 1.

Comparative Example 3

The procedure of Example 1 was repeated except that nitrogen whose oxygen content had been adjusted to 50 ppm was injected and a 185° C. heating medium was circulated to adjust the temperature of the solution to 180° C. and keep that temperature for 10 hours. At this point, the oxygen analyzer read 48 ppm and the $A_0$ value in the equation of the present invention was 0.041. The results are shown in Table 1.

Comparative Example 4

The procedure of Example 1 was repeated except that nitrogen whose oxygen content had been adjusted to 50 ppm was injected and a 190° C. heating medium was circulated to adjust the temperature of the solution to 180° C. and keep that temperature for 10 hours. At this point, the oxygen analyzer read 52 ppm and the $A_0$ value in the equation of the present invention was 0.086. The results are shown in Table 1.

Comparative Example 5

The procedure of Example 1 was repeated except that nitrogen whose oxygen content had been adjusted to 50 ppm was injected and a 190° C. heating medium was circulated to adjust the temperature of the solution to 160° C. and keep that temperature for 10 hours. At this point, the oxygen analyzer read 57 ppm and the $A_0$ value in the equation of the present invention was 0.078. The results are shown in Table 1.

Comparative Example 6

The procedure of Example 1 was repeated except that nitrogen whose oxygen content had been adjusted to 100 ppm was injected and a 185° C. heating medium was circulated to adjust the temperature of the solution to 180° C. and keep that temperature for 10 hours. At this point, the oxygen analyzer read 112 ppm and the $A_0$ value in the equation of the present invention was 0.107. The results are shown in Table 1.

Comparative Example 7

The procedure of Example 1 was repeated except that nitrogen whose oxygen content had been adjusted to 100 ppm was injected and a 170° C. heating medium was circulated to adjust the temperature of the solution to 160° C. and keep that temperature for 40 hours. At this point, the oxygen analyzer read 101 ppm and the $A_0$ value in the equation of the present invention was 0.017. The results are shown in Table 1.

Comparative Example 8

The procedure of Example 1 was repeated except that nitrogen whose oxygen content had been adjusted to 100 ppm was injected and a 180° C. heating medium was circulated to adjust the temperature of the solution to 150° C. and keep that temperature for 10 hours. At this point, the oxygen analyzer read 109 ppm and the $A_0$ value in the equation of the present invention was 0.034. The results are shown in Table 1.

Example 12

1,000 parts of bisphenol A was charged into a 3 liters storage container made of SUS316, equipped with a stirrer and connected to an oxygen analyzer, and nitrogen whose oxygen content had been adjusted to 0.1 ppm was injected at a rate of 2 liters/min and a temperature of 20° C. for 20 hours under agitation. This bisphenol A was designated as reference bisphenol A. The water content of this reference bisphenol A was ND (less than 1 ppm) and the oxygen content thereof was 0.1 ppm. Nitrogen whose oxygen content had been adjusted to 10 ppm was injected at a rate of 2 liters/min and a temperature of 20° C. for 0.5 hour while this reference bisphenol A was stirred, 0.05 part of water was added, and the resulting solution was kept at −10° C. for 12 hours under agitation. This bisphenol A had a water content of 48 ppm and an oxygen content of 10 ppm. The $B_1$ value in the equation of the present invention at this point was −0.183. 1,000 parts of this bisphenol A and 960 parts of diphenyl carbonate which was kept in a molten state at 90° C. were charged into a vertical batch type reactor equipped with a fractionating column and stirrer, $5 \times 10^{-7}$ equivalent of sodium phenoxide as an alkali metal compound and $1 \times 10^{-4}$ equivalent of tetramethylammonium hydroxide as a nitrogen-containing basic compound were added based on 1 mol of bisphenol A, the pressure was reduced to 4.0 kPa (30 mmHg) over 1 hour under heating to 220° C., and this state was maintained for 1 hour to distill off most of phenol. The pressure was further reduced to 133 Pa (1 mmHg) over 1 hour under heating to 270° C. and a reaction was then carried out for 1 hour to obtain a polycarbonate having a viscosity average molecular weight of 15,200. The polycarbonate in a molten state was extruded from a die and pelletized by a pelletizer. The "b" value of the obtained pellet was −0.4. The results are shown in Table 2.

Example 13

The procedure of Example 12 was repeated except that nitrogen whose oxygen content had been adjusted to 10 ppm was injected into the reference bisphenol A, 0.05 part of water was added, and the resulting solution was kept at 10° C. for 12 hours. This bisphenol A had a water content of 47 ppm and an oxygen content of 10 ppm. The $B_1$ value in the equation of the present invention at this point was −0.207. The results are shown in Table 2.

Example 14

The procedure of Example 12 was repeated except that nitrogen whose oxygen content had been adjusted to 10 ppm was injected into the reference bisphenol A, 0.05 part of water was added, and the resulting solution was kept at 10° C. for 120 hours. This bisphenol A had a water content of 45 ppm and an oxygen content of 10 ppm. The $B_1$ value in the equation of the present invention at this point was −0.024. The results are shown in Table 2.

Example 15

The procedure of Example 12 was repeated except that nitrogen whose oxygen content had been adjusted to 10 ppm was injected into the reference bisphenol A, 0.05 part of water was added, and the resulting solution was kept at 30° C. for 12 hours. This bisphenol A had a water content of 45 ppm and an oxygen content of 10 ppm. The $B_1$ value in the equation of the present invention at this point was −0.232. The results are shown in Table 2.

Example 16

The procedure of Example 12 was repeated except that nitrogen whose oxygen content had been adjusted to 10 ppm was injected into the reference bisphenol A, 0.05 part of water was added, and the resulting solution was kept at 30° C. for 120 hours. This bisphenol A had a water content of 48 ppm and an oxygen content of 10 ppm. The $B_1$ value in the equation of the present invention at this point was −0.047. The results are shown in Table 2.

Example 17

The procedure of Example 12 was repeated except that nitrogen whose oxygen content had been adjusted to 10 ppm was injected into the reference bisphenol A, 0.10 part of water was added, and the resulting solution was kept at −10° C. for 12 hours. This bisphenol A had a water content of 94 ppm and an oxygen content of 10 ppm. The $B_1$ value in the equation of the present invention at this point was −0.169. The results are shown in Table 2.

Example 18

The procedure of Example 12 was repeated except that nitrogen whose oxygen content had been adjusted to 10 ppm was injected into the reference bisphenol A, 0.10 part of water was added, and the resulting solution was kept at 10° C. for 12 hours. This bisphenol A had a water content of 97 ppm and an oxygen content of 10 ppm. The $B_1$ value in the equation of the present invention at this point was −0.192. The results are shown in Table 2.

Example 19

The procedure of Example 12 was repeated except that nitrogen whose oxygen content had been adjusted to 10 ppm was injected into the reference bisphenol A, 0.10 part of water was added, and the resulting solution was kept at 10° C. for 120 hours. This bisphenol A had a water content of 98 ppm and an oxygen content of 10 ppm. The $B_1$ value in the equation of the present invention at this point was −0.008. The results are shown in Table 2.

Example 20

The procedure of Example 12 was repeated except that nitrogen whose oxygen content had been adjusted to 10 ppm was injected into the reference bisphenol A, 0.10 part of water was added, and the resulting solution was kept at 30° C. for 12 hours. This bisphenol A had a water content of 94 ppm and an oxygen content of 10 ppm. The $B_1$ value in the equation of the present invention at this point was −0.217. The results are shown in Table 2.

Example 21

The procedure of Example 12 was repeated except that nitrogen whose oxygen content had been adjusted to 10 ppm was injected into the reference bisphenol A, 0.10 part of water was added, and the resulting solution was kept at 30° C. for 120 hours. This bisphenol A had a water content of 93 ppm and an oxygen content of 10 ppm. The $B_1$ value in the equation of the present invention at this point was −0.033. The results are shown in Table 2.

Example 22

The procedure of Example 12 was repeated except that nitrogen whose oxygen content had been adjusted to 10 ppm was injected into the reference bisphenol A, 0.50 part of water was added, and the resulting solution was kept at −10° C. for 12 hours. This bisphenol A had a water content of 476 ppm and an oxygen content of 10 ppm. The $B_1$ value in the equation of the present invention at this point was −0.136. The results are shown in Table 2.

Example 23

The procedure of Example 12 was repeated except that nitrogen whose oxygen content had been adjusted to 10 ppm was injected into the reference bisphenol A, 0.50 part of water was added, and the resulting solution was kept at 10° C. for 12 hours. This bisphenol A had a water content of 483 ppm and an oxygen content of 10 ppm. The $B_1$ value in the equation of the present invention at this point was −0.159. The results are shown in Table 2.

Example 24

The procedure of Example 12 was repeated except that nitrogen whose oxygen content had been adjusted to 10 ppm was injected into the reference bisphenol A, 0.50 part of water was added, and the resulting solution was kept at 30° C. for 12 hours. This bisphenol A had a water content of 491 ppm and an oxygen content of 10 ppm. The $B_1$ value in the equation of the present invention at this point was −0.183. The results are shown in Table 2.

Example 25

The procedure of Example 12 was repeated except that nitrogen whose oxygen content had been adjusted to 50 ppm was injected into the reference bisphenol A, 0.01 part of water was added, and the resulting solution was kept at −10° C. for 12 hours. This bisphenol A had a water content of 8 ppm and an oxygen content of 50 ppm. The $B_1$ value in the equation of the present invention at this point was −0.128. The results are shown in Table 2.

Example 26

The procedure of Example 12 was repeated except that nitrogen whose oxygen content had been adjusted to 50 ppm was injected into the reference bisphenol A, 0.01 part of water was added, and the resulting solution was kept at 30° C. for 12 hours. This bisphenol A had a water content of 8 ppm and an oxygen content of 50 ppm. The $B_1$ value in the equation of the present invention at this point was −0.176. The results are shown in Table 2.

Example 27

The procedure of Example 12 was repeated except that nitrogen whose oxygen content had been adjusted to 50 ppm was injected into the reference bisphenol A, 0.05 part of water was added, and the resulting solution was kept at −10° C. for 12 hours. This bisphenol A had a water content of 44 ppm and an oxygen content of 50 ppm. The $B_1$ value in the equation of the present invention at this point was −0.093. The results are shown in Table 2.

Example 28

The procedure of Example 12 was repeated except that nitrogen whose oxygen content had been adjusted to 50 ppm was injected into the reference bisphenol A, 0.05 part of water was added, and the resulting solution was kept at 30° C. for 12 hours. This bisphenol A had a water content of 48 ppm and an oxygen content of 50 ppm. The $B_1$ value in the equation of the present invention at this point was −0.139. The results are shown in Table 2.

Example 29

The procedure of Example 12 was repeated except that nitrogen whose oxygen content had been adjusted to 50 ppm was injected into the reference bisphenol A, 0.10 part of water was added, and the resulting solution was kept at −10° C. for 12 hours. This bisphenol A had a water content of 95 ppm and an oxygen content of 50 ppm. The $B_1$ value in the equation of the present invention at this point was −0.077. The results are shown in Table 2.

Example 30

The procedure of Example 12 was repeated except that nitrogen whose oxygen content had been adjusted to 50 ppm was injected into the reference bisphenol A, 0.10 part of water was added, and the resulting solution was kept at 30° C. for 12 hours. This bisphenol A had a water content of 92 ppm and an oxygen content of 50 ppm. The $B_1$ value in the equation of the present invention at this point was −0.126. The results are shown in Table 2.

Example 31

The procedure of Example 12 was repeated except that nitrogen whose oxygen content had been adjusted to 50 ppm was injected into the reference bisphenol A, 0.50 part of water was added, and the resulting solution was kept at −10° C. for 12 hours. This bisphenol A had a water content of 471 ppm and an oxygen content of 50 ppm. The $B_1$ value in the equation of the present invention at this point was −0.044. The results are shown in Table 2.

Example 32

The procedure of Example 12 was repeated except that nitrogen whose oxygen content had been adjusted to 50 ppm was injected into the reference bisphenol A, 0.50 part of water was added, and the resulting solution was kept at 30° C. for 12 hours. This bisphenol A had a water content of 474 ppm and an oxygen content of 50 ppm. The $B_1$ value in the equation of the present invention at this point was −0.092. The results are shown in Table 2.

Example 33

The procedure of Example 12 was repeated except that nitrogen whose oxygen content had been adjusted to 200 ppm was injected into the reference bisphenol A, 0.01 part of water was added, and the resulting solution was kept at −10° C. for 12 hours. This bisphenol A had a water content of 8 ppm and an oxygen content of 200 ppm. The $B_1$ value in the equation of the present invention at this point was −0.049. The results are shown in Table 2.

Example 34

The procedure of Example 12 was repeated except that nitrogen whose oxygen content had been adjusted to 200 ppm was injected into the reference bisphenol A, 0.01 part of water was added, and the resulting solution was kept at 30° C. for 12 hours. This bisphenol A had a water content of 7 ppm and an oxygen content of 200 ppm. The $B_1$ value in the equation of the present invention at this point was −0.099. The results are shown in Table 2.

Example 35

The procedure of Example 12 was repeated except that nitrogen whose oxygen content had been adjusted to 200 ppm was injected into the reference bisphenol A, 0.05 part of water was added, and the resulting solution was kept at −10° C. for 12 hours. This bisphenol A had a water content of 42 ppm and an oxygen content of 200 ppm. The $B_1$ value in the equation of the present invention at this point was −0.015. The results are shown in Table 2.

Example 36

The procedure of Example 12 was repeated except that nitrogen whose oxygen content had been adjusted to 200 ppm was injected into the reference bisphenol A, 0.05 part of water was added, and the resulting solution was kept at 30° C. for 12 hours. This bisphenol A had a water content of 46 ppm and an oxygen content of 200 ppm. The $B_1$ value in the equation of the present invention at this point was −0.061. The results are shown in Table 2.

Example 37

The procedure of Example 12 was repeated except that nitrogen whose oxygen content had been adjusted to 200 ppm was injected into the reference bisphenol A, 0.10 part of water was added, and the resulting solution was kept at 10° C. for 12 hours. This bisphenol A had a water content of 93 ppm and an oxygen content of 200 ppm. The $B_1$ value in the equation of the present invention at this point was −0.023. The results are shown in Table 2.

Example 38

The procedure of Example 12 was repeated except that nitrogen whose oxygen content had been adjusted to 200 ppm was injected into the reference bisphenol A, 0.10 part of water was added, and the resulting solution was kept at 30° C. for 12 hours. This bisphenol A had a water content of 97 ppm and an oxygen content of 200 ppm. The $B_1$ value in the equation of the present invention at this point was −0.046. The results are shown in Table 2.

Example 39

The procedure of Example 12 was repeated except that nitrogen whose oxygen content had been adjusted to 200 ppm was injected into the reference bisphenol A, 0.50 part of water was added, and the resulting solution was kept at 30° C. for 12 hours. This bisphenol A had a water content of 465 ppm and an oxygen content of 200 ppm. The $B_1$ value in the equation of the present invention at this point was −0.014. The results are shown in Table 2.

Example 40

1,000 parts of bisphenol A was charged into a 3 liters storage container made of SUS316, equipped with a stirrer and connected to an oxygen analyzer, and nitrogen whose oxygen content had been adjusted to 0.1 ppm was injected at a rate of 2 liters/min and a temperature of 20° C. for 20 hours under agitation. This bisphenol A was designated as reference bisphenol A. The water content of this reference bisphenol A was ND (less than 1 ppm) and the oxygen content thereof was 0.1 ppm. Nitrogen whose oxygen content had been adjusted to 10 ppm was injected at a rate of 2 liters/min and a temperature of 20° C. for 0.5 hour while this reference bisphenol A was stirred, 0.05 part of water was added, and the resulting solution was kept at 10° C. for 12 hours under agitation. This bisphenol A had a water content of 47 ppm and an oxygen content of 10 ppm. The $B_1$ value in the equation of the present invention at this point was −0.207. 1,000 parts of diphenyl carbonate was charged into a similar storage container, and nitrogen whose oxygen content had been adjusted to 0.1 ppm was injected at a rate of 2 liters/min and a temperature of 20° C. for 20 hours. This diphenyl carbonate was designated as reference diphenyl carbonate. The water content of this reference diphenyl carbonate was ND (less than 1 ppm) and the oxygen content thereof was 0.1 ppm. Nitrogen whose oxygen content had been adjusted to 10 ppm was injected at a rate of 2 liters/min and a temperature of 20° C. for 0.5 hour while this reference diphenyl carbonate was stirred, 0.05 part of water was added, and the resulting solution was kept at −10° C. for 12 hours under agitation. This diphenyl carbonate had a water content of 44 ppm and an oxygen content of 10 ppm. The $B_2$ value in the equation of the present invention at this point was −0.184.

1,000 parts of the above bisphenol A and 960 parts of the above diphenyl carbonate were charged into a vertical batch type reactor equipped with a fractionating column and stirrer, and $5 \times 10^{-7}$ equivalent of sodium phenoxide as a metal and $1 \times 10^{-4}$ equivalent of tetramethylammonium hydroxide as basic nitrogen were added based on 1 mol of bisphenol A, the pressure was reduced to 4.0 kPa (30 mmHg) over 1 hour under heating to 220° C., and this state was maintained for 1 hour to distill off most of phenol. The pressure was further reduced to 133 Pa (1 mmHg) over 1 hour under heating to 270° C. and a reaction was then carried out for 1 hour to obtain a polycarbonate having a viscosity average molecular weight of 15,200. The polycarbonate in a molten state was extruded from a die and pelletized by a pelletizer. The storage conditions of bisphenol A and the results are shown in Table 2.

Comparative Example 9

The procedure of Example 12 was repeated except that nitrogen whose oxygen content had been adjusted to 10 ppm was injected into the reference bisphenol A, 0.05 part of water was added, and the resulting solution was kept at −10° C. for 120 hours. This bisphenol A had a water content of 49 ppm and an oxygen content of 10 ppm. The $B_1$ value in the equation of the present invention at this point was 0.001. The results are shown in Table 2.

Comparative Example 10

The procedure of Example 12 was repeated except that nitrogen whose oxygen content had been adjusted to 10 ppm was injected into the reference bisphenol A, 0.10 part of water was added, and the resulting solution was kept at −10° C. for 120 hours. This bisphenol A had a water content of 95 ppm and an oxygen content of 10 ppm. The $B_1$ value in the equation of the present invention at this point was 0.015. The results are shown in Table 2.

Comparative Example 11

The procedure of Example 12 was repeated except that nitrogen whose oxygen content had been adjusted to 10 ppm was injected into the reference bisphenol A, 0.50 part of water was added, and the resulting solution was kept at −10° C. for 96 hours. This bisphenol A had a water content of 470 ppm and an oxygen content of 10 ppm. The $B_1$ value in the equation of the present invention at this point was 0.007. The results are shown in Table 2.

Comparative Example 12

The procedure of Example 12 was repeated except that nitrogen whose oxygen content had been adjusted to 10 ppm was injected into the reference bisphenol A, 0.50 part of water was added, and the resulting solution was kept at 10° C. for 108 hours. This bisphenol A had a water content of 489 ppm and an oxygen content of 10 ppm. The $B_1$ value in the equation of the present invention at this point was 0.004. The results are shown in Table 2.

Comparative Example 13

The procedure of Example 12 was repeated except that nitrogen whose oxygen content had been adjusted to 10 ppm was injected into the reference bisphenol A, 0.50 part of water was added, and the resulting solution was kept at 30° C. for 132 hours. This bisphenol A had a water content of 499 ppm and an oxygen content of 10 ppm. The $B_1$ value in the equation of the present invention at this point was 0.021. The results are shown in Table 2.

Comparative Example 14

The procedure of Example 12 was repeated except that nitrogen whose oxygen content had been adjusted to 50 ppm was injected into the reference bisphenol A, 0.01 part of water was added, and the resulting solution was kept at −10° C. for 96 hours. This bisphenol A had a water content of 7 ppm and an oxygen content of 50 ppm. The $B_1$ value in the equation of the present invention at this point was 0.012. The results are shown in Table 2.

Comparative Example 15

The procedure of Example 12 was repeated except that nitrogen whose oxygen content had been adjusted to 50 ppm was injected into the reference bisphenol A, 0.01 part of water was added, and the resulting solution was kept at 30° C. for 120 hours. This bisphenol A had a water content of 9 ppm and an oxygen content of 50 ppm. The $B_1$ value in the equation of the present invention at this point was 0.010. The results are shown in Table 2.

Comparative Example 16

The procedure of Example 12 was repeated except that nitrogen whose oxygen content had been adjusted to 50 ppm was injected into the reference bisphenol A, 0.05 part of water was added, and the resulting solution was kept at −10° C. for 72 hours. This bisphenol A had a water content of 48 ppm and an oxygen content of 50 ppm. The $B_1$ value in the equation of the present invention at this point was 0.011. The results are shown in Table 2.

Comparative Example 17

The procedure of Example 12 was repeated except that nitrogen whose oxygen content had been adjusted to 50 ppm was injected into the reference bisphenol A, 0.05 part of water was added, and the resulting solution was kept at 30° C. for 96 hours. This bisphenol A had a water content of 46 ppm and an oxygen content of 50 ppm. The $B_1$ value in the equation of the present invention at this point was 0.003. The results are shown in Table 2.

Comparative Example 18

The procedure of Example 12 was repeated except that nitrogen whose oxygen content had been adjusted to 50 ppm was injected into the reference bisphenol A, 0.10 part of water was added, and the resulting solution was kept at −10° C. for 60 hours. This bisphenol A had a water content of 95 ppm and an oxygen content of 50 ppm. The $B_1$ value in the equation of the present invention at this point was 0.005. The results are shown in Table 2.

Comparative Example 19

The procedure of Example 1 was repeated except that nitrogen whose oxygen content had been adjusted to 50 ppm was injected into the reference bisphenol A, 0.10 part of water was added, and the resulting solution was kept at 30° C. for 96 hours. This bisphenol A had a water content of 91 ppm and an oxygen content of 50 ppm. The $B_1$ value in the equation of the present invention at this point was 0.017. The results are shown in Table 1.

Comparative Example 20

The procedure of Example 1 was repeated except that nitrogen whose oxygen content had been adjusted to 50 ppm was injected into the reference bisphenol A, 0.50 part of water was added, and the resulting solution was kept at −10° C. for 48 hours. This bisphenol A had a water content of 490 ppm and an oxygen content of 50 ppm. The $B_1$ value in the equation of the present invention at this point was 0.018. The results are shown in Table 2.

Comparative Example 21

The procedure of Example 12 was repeated except that nitrogen whose oxygen content had been adjusted to 50 ppm was injected into the reference bisphenol A, 0.50 part of water was added, and the resulting solution was kept at 30° C. for 72 hours. This bisphenol A had a water content of 499 ppm and an oxygen content of 50 ppm. The $B_1$ value in the equation of the present invention at this point was 0.011. The results are shown in Table 2.

Comparative Example 22

The procedure of Example 12 was repeated except that nitrogen whose oxygen content had been adjusted to 200 ppm was injected into the reference bisphenol A, 0.01 part of water was added, and the resulting solution was kept at −10° C. for 48 hours. This bisphenol A had a water content of 7 ppm and an oxygen content of 200 ppm. The $B_1$ value in the equation of the present invention at this point was 0.010. The results are shown in Table 2.

Comparative Example 23

The procedure of Example 12 was repeated except that nitrogen whose oxygen content had been adjusted to 200 ppm was injected into the reference bisphenol A, 0.01 part of water was added, and the resulting solution was kept at 30° C. for 72 hours. This bisphenol A had a water content of 9 ppm and an oxygen content of 200 ppm. The $B_1$ value in the equation of the present invention at this point was 0.008. The results are shown in Table 2.

Comparative Example 24

The procedure of Example 12 was repeated except that nitrogen whose oxygen content had been adjusted to 200 ppm was injected into the reference bisphenol A, 0.05 part of water was added, and the resulting solution was kept at −10° C. for 24 hours. This bisphenol A had a water content of 48 ppm and an oxygen content of 200 ppm. The $B_1$ value in the equation of the present invention at this point was 0.008. The results are shown in Table 2.

Comparative Example 25

The procedure of Example 12 was repeated except that nitrogen whose oxygen content had been adjusted to 200 ppm was injected into the reference bisphenol A, 0.05 part of water was added, and the resulting solution was kept at 30° C. for 48 hours. This bisphenol A had a water content of 49 ppm and an oxygen content of 200 ppm. The $B_1$ value in the equation of the present invention at this point was 0.001. The results are shown in Table 2.

Comparative Example 26

The procedure of Example 12 was repeated except that nitrogen whose oxygen content had been adjusted to 200 ppm was injected into the reference bisphenol A, 0.10 part of water was added, and the resulting solution was kept at 10° C. for 36 hours. This bisphenol A had a water content of 95 ppm and an oxygen content of 200 ppm. The A value in the equation of the present invention at this point was 0.019. The results are shown in Table 2.

Comparative Example 27

The procedure of Example 12 was repeated except that nitrogen whose oxygen content had been adjusted to 200 ppm was injected into the reference bisphenol A, 0.10 part of water was added, and the resulting solution was kept at 30° C. for 48 hours. This bisphenol A had a water content of 91 ppm and an oxygen content of 200 ppm. The $B_1$ value in the equation of the present invention at this point was 0.014. The results are shown in Table 2.

Comparative Example 28

The procedure of Example 12 was repeated except that nitrogen whose oxygen content had been adjusted to 200 ppm was injected into the reference bisphenol A, 50 parts of water was added, and the resulting solution was kept at 30° C. for 24 hours. This bisphenol A had a water content of 480 ppm and an oxygen content of 200 ppm. The $B_1$ value in the equation of the present invention at this point was 0.007. The results are shown in Table 2.

Example 41

960 parts of diphenyl carbonate was charged into a vertical batch type autoclave made of SUS316, equipped with a fractionating column, stirrer and jacket and connected to an oxygen analyzer, and a 130° C. heating medium was circulated in the jacket of the autoclave to adjust the temperature of the diphenyl carbonate solution to 120° C. and keep that temperature for 100 hours while nitrogen whose oxygen content had been adjusted to 10 ppm was injected at a rate of 2 liters/min. At this point, the oxygen analyzer read 12 ppm and the $A_1$ value in the equation of the present invention was −0.818. Then, 1,000 parts of bisphenol A and $5 \times 10^{-7}$ equivalent based on 1 mol of bisphenol A of sodium phenoxide as a metal and $1 \times 10^{-4}$ equivalent based on the above standard of tetramethylammonium hydroxide as basic nitrogen were added, the pressure was reduced to 4.0 kPa (30 mmHg) over 1 hour under heating to 220° C., and this state was maintained for 1 hour to distill off most of phenol.

The pressure was further reduced to 133 Pa (1 mmHg) over 1 hour under heating to 270° C. and a reaction was then carried out for 1 hour to obtain a polycarbonate having a viscosity average molecular weight of 15,200. The polycarbonate in a molten state was extruded from a die and pelletized by a pelletizer. The results are shown in Table 3.

Comparative Example 29

960 parts of diphenyl carbonate was charged into a vertical batch type autoclave made of SUS316, and a 230° C. heating medium was circulated into the jacket of the autoclave to adjust the temperature of the diphenyl carbonate solution to 220° C. and keep that temperature for 100 hours while nitrogen whose oxygen content had been adjusted to 10 ppm was injected at a rate of 2 liters/min. The oxygen analyzer at this point read 12 ppm and the $A_1$ value in the equation of the present invention was 0.064. Polymerization was carried out in the same manner as in Example 41 except above to obtain a polycarbonate. The results are shown in Table 3.

Example 42

1,000 parts of bisphenol A was charged into a storage container made of SUS316, equipped with a stirrer and connected to an oxygen analyzer, and nitrogen whose oxygen content had been adjusted to 0.1 ppm was caused to purge at a rate of 2 liters/min and a temperature of 20° C. for 20 hours under agitation. This bisphenol A was designated as reference bisphenol A. The water content of this reference bisphenol A was ND (less than 1 ppm) and the oxygen content thereof was 0.1 ppm. Nitrogen whose oxygen content had been adjusted to 10 ppm was caused to purge at a rate of 2 liters/min and a temperature of 20° C. for 0.5 hour while this reference bisphenol A was stirred, 0.05 part of water was added, and the resulting solution was kept at 30° C. for 12 hours under agitation. This bisphenol A had a water content of 45 ppm and an oxygen content of 10 ppm. The $B_1$ value in the equation of the present invention was −0.232 at this point. This bisphenol A and 960 parts of diphenyl carbonate were charged into a vertical batch type reactor equipped with a fractionating column and stirrer, nitrogen whose oxygen content had been adjusted to 10 ppm was injected, and a 135° C. heating medium was circulated to adjust the temperature of the mixture to 130° C. and keep that temperature for 10 hours. At this point, the oxygen analyzer read 12 ppm and the $A_0$ value in the equation of the present invention was −0.541. Polymerization was then carried out in the same manner as in Example 41 except above to obtain a polycarbonate. The results are shown in Table 3.

Example 43

1,000 parts of bisphenol A was charged into a storage container made of SUS316, equipped with a stirrer and connected to an oxygen analyzer, and nitrogen whose oxygen content had been adjusted to 0.1 ppm was caused to purge at a rate of 2 liters/min and a temperature of 20° C. for 20 hours under agitation. This bisphenol A was designated as reference bisphenol A. The water content of this reference bisphenol A was ND (less than 1 ppm) and the oxygen content thereof was 0.1 ppm. Nitrogen whose oxygen content had been adjusted to 10 ppm was caused to purge at a rate of 2 liters/min and a temperature of 20° C. for 0.5 hour while this reference bisphenol A was stirred, 0.05 part of water was added, and the resulting solution was kept at 30° C. for 12 hours under agitation. This bisphenol A had a water content of 45 ppm and an oxygen content of 10 ppm. The $B_1$ value in the equation of the present invention was −0.232 at this point. This bisphenol A and 960 parts of diphenyl carbonate were charged into a vertical batch type reactor equipped with a fractionating column and stirrer, nitrogen whose oxygen content had been adjusted to 10 ppm was injected, and a 160° C. heating medium was circulated to adjust the temperature of the solution to 130° C. and keep that temperature for 10 hours. At this point, the oxygen analyzer read 109 ppm and the $A_0$ value in the equation of the present invention was −0.174. Polymerization was then carried out in the same manner as in Example 41 except above to obtain a polycarbonate. The results are shown in Table 3.

Example 44

960 parts of diphenyl carbonate was charged into a vertical batch type autoclave made of SUS316, equipped with a fractionating column, stirrer and jacket and connected to an oxygen analyzer, and a 130° C. heating medium was circulated into the jacket of the autoclave to adjust the temperature of the diphenyl carbonate solution to 120° C. and keep that temperature for 100 hours while nitrogen whose oxygen content had been adjusted to 10 ppm was injected at a rate of 2 liters/min. The oxygen analyzer at this point read 12 ppm and the $A_1$ value in the equation of the present invention was −0.818. 1,000 parts of bisphenol A was then added, nitrogen whose oxygen content had been adjusted to 10 ppm was injected, and a 135° C. heating medium was circulated to adjust the temperature of the solution at 130° C. and keep that temperature for 10 hours. At this point, the oxygen analyzer read 12 ppm and the $A_0$ value in the equation of the present invention was −0.541. Polymerization was carried out in the same manner as in Example 41 except above to obtain a polycarbonate. The results are shown in Table 3.

Example 45

960 parts of diphenyl carbonate was charged into a vertical batch type autoclave made of SUS316, equipped with a fractionating column, stirrer and jacket and connected to an oxygen analyzer, and a 130° C. heating medium was circulated in the jacket of the autoclave to adjust the temperature of the diphenyl carbonate solution to 120° C. and keep that temperature for 100 hours while nitrogen whose oxygen content had been adjusted to 10 ppm was injected at a rate of 2 liters/min. The oxygen analyzer at this point read 12 ppm and the $A_1$ value in the equation of the present invention was −0.818. 1,000 parts of bisphenol A was then added, nitrogen whose oxygen content had been adjusted to 100 ppm was injected, and a 160° C. heating medium was circulated to adjust the temperature of the solution at 130° C. and keep that temperature for 10 hours. At this point, the oxygen analyzer read 109 ppm and the $A_0$ value in the equation of the present invention was −0.174. Polymerization was carried out in the same manner as in Example 41 except above to obtain a polycarbonate. The results are shown in Table 3.

Example 46

960 parts of diphenyl carbonate was charged into a storage container made of SUS316, equipped with a stirrer and connected to an oxygen analyzer, and nitrogen whose oxygen content had been adjusted to 0.1 ppm was caused to purge at a rate of 2 liters/min and a temperature of 20° C. for 20 hours under agitation. This diphenyl carbonate was designated as reference diphenyl carbonate. The water content of this reference diphenyl carbonate was ND (less than 1 ppm) and the oxygen content thereof was 0.1 ppm. Nitrogen whose oxygen content had been adjusted to 10 ppm was caused to purge at a rate of 2 liters/min and a temperature of 20° C. for 0.5 hour while this reference diphenyl carbonate was stirred, 0.05 part of water was added, and the resulting solution was kept at −10° C. for 12 hours under agitation. This diphenyl carbonate had a water content of 44 ppm and an oxygen content of 10 ppm. The $B_2$ value in the equation of the present invention at this point was −0.184. This diphenyl carbonate and 1,000 parts of bisphenol A were charged into a vertical batch type reactor equipped with a fractionating column and stirrer, nitrogen whose oxygen content had been adjusted to 10 ppm was injected, and a 135° C. heating medium was circulated to adjust the temperature of the solution to 130° C. and keep that temperature for 10 hours. The oxygen analyzer at this point read 12 ppm and the $A_0$ value in the equation of the present invention was −0.541. Polymerization was carried out in the same manner as in Example 41 except above to obtain a polycarbonate. The results are shown in Table 3.

Example 47

960 parts of diphenyl carbonate was charged into a storage container made of SUS316, equipped with a stirrer and connected to an oxygen analyzer, and nitrogen whose oxygen content had been adjusted to 0.1 ppm was caused to purge at a rate of 2 liters/min and a temperature of 20° C. for 20 hours under agitation. This diphenyl carbonate was designated as reference diphenyl carbonate. The water content of this reference diphenyl carbonate was ND (less than 1 ppm) and the oxygen content there of was 0.1 ppm. Nitrogen whose oxygen content had been adjusted to 10 ppm was caused to purge at a rate of 2 liters/min and a temperature of 20° C. for 0.5 hour while this reference diphenyl carbonate was stirred, 0.05 part of water was added, and the resulting solution was kept at −10° C. for 12 hours under agitation. This diphenyl carbonate had a water content of 44 ppm and an oxygen content of 10 ppm. The $B_2$ value in the equation of the present invention at this point was −0.184. This diphenyl carbonate and 1,000 parts of bisphenol A were charged into a vertical batch type reactor equipped with a fractionating column and stirrer, nitrogen whose oxygen content had been adjusted to 100 ppm was injected, and a 160° C. heating medium was circulated to adjust the temperature of the solution to 130° C. and keep that temperature for 10 hours. The oxygen analyzer at this point read 109 ppm and the $A_0$ value in the equation of the present invention was −0.174. Polymerization was carried out in the same manner as in Example 41 except above to obtain a polycarbonate. The results are shown in Table 3.

Example 48

960 parts of diphenyl carbonate was charged into a vertical batch type autoclave made of SUS316, equipped with a fractionating column, stirrer and jacket and connected to an oxygen analyzer, and a 130° C. heating medium was circulated in the jacket of the autoclave to adjust the temperature of the diphenyl carbonate to 120° C. and keep that temperature for 100 hours while nitrogen whose oxygen content had been adjusted to 10 ppm was injected at a rate of 2 liters/min. The oxygen analyzer at this point read 12 ppm and the $A_1$ value in the equation of the present invention was −0.818. 1,000 parts of bisphenol A was charged into a storage container made of SUS316, equipped with a stirrer and connected to an oxygen analyzer, and nitrogen whose oxygen content had been adjusted to 0.1 ppm was caused to purge at a rate of 2 liters/min and a temperature of 20° C. for 20 hours under agitation. This bisphenol A was designated as reference bisphenol A. The water content of this reference bisphenol A was ND (less than 1 ppm) and the oxygen content thereof was 0.1 ppm. Nitrogen whose oxygen content had been adjusted to 10 ppm was caused to purge at a rate of 2 liters/min and a temperature of 20° C. for 0.5 hour while this reference bisphenol A was stirred, 0.05 part of water was added, and the resulting solution was kept at 30° C. for 12 hours under agitation. This bisphenol A had a water content of 45 ppm and an oxygen content of 10 ppm. The $B_1$ value in the equation of the present invention at this point was −0.232. Polymerization was carried out using the above prepared diphenyl carbonate and bisphenol A in the same manner as in Example 41 to obtain a polycarbonate. The results are shown in Table 3.

Example 49

960 parts of diphenyl carbonate was charged into a vertical batch type autoclave made of SUS316, equipped with a fractionating column, stirrer and jacket and connected to an oxygen analyzer, and a 130° C. heating medium was circulated in the jacket of the autoclave to adjust the temperature of the diphenyl carbonate to 120° C. and keep that temperature for 100 hours while nitrogen whose oxygen content had been adjusted to 10 ppm was injected at a rate of 2 liters/min. The oxygen analyzer at this point read 12 ppm and the $A_1$ value in the equation of the present invention was −0.818. 1,000 parts of bisphenol A was charged into a storage container made of SUS316, equipped with a stirrer and connected to an oxygen analyzer, and nitrogen whose oxygen content had been adjusted to 0.1 ppm was caused to purge at a rate of 2 liters/min and a temperature of 20° C. for 20 hours under agitation. This bisphenol A was designated as reference bisphenol A. The water content of this reference bisphenol A was ND (less than 1 ppm) and the oxygen content thereof was 0.1 ppm. Nitrogen whose oxygen content had been adjusted to 200 ppm was caused to purge at a rate of 2 liters/min and a temperature of 20° C. for 0.5 hour while this reference bisphenol A was stirred, 0.5 part of water was added, and the resulting solution was kept at 30° C. for 12 hours under agitation. This bisphenol A had a water content of 465 ppm and an oxygen content of 200 ppm. The $B_1$ value in the equation of the present invention at this point was −0.014. Polymerization was carried out using the above prepared diphenyl carbonate and bisphenol A in the same manner as in Example 41 to obtain a polycarbonate. The results are shown in Table 3.

TABLE 1

| | oxygen content $C_0$ (ppm) | temperature of molten mixture $T_0$ (° C.) | temperature difference $U_0$ (° C.) | average residence time $\tau_0$ (hr) | melt keeping parameter $A_0$ | viscosity average molecular weight | b value |
|---|---|---|---|---|---|---|---|
| Ex. 1 | 12 | 130 | 5 | 10 | −0.541 | 15200 | −0.5 |
| Ex. 2 | 11 | 180 | 5 | 10 | −0.073 | 15100 | −0.2 |
| Ex. 3 | 10 | 130 | 10 | 40 | −0.465 | 15300 | −0.4 |
| Ex. 4 | 10 | 160 | 10 | 40 | −0.162 | 15200 | −0.3 |
| Ex. 5 | 10 | 130 | 30 | 10 | −0.360 | 15300 | −0.4 |
| Ex. 6 | 48 | 130 | 5 | 10 | −0.433 | 15400 | −0.4 |
| Ex. 7 | 53 | 130 | 10 | 10 | −0.386 | 15200 | −0.3 |
| Ex. 8 | 50 | 130 | 30 | 10 | −0.235 | 15300 | −0.3 |
| Ex. 9 | 108 | 130 | 5 | 10 | −0.370 | 15200 | −0.5 |
| Ex. 10 | 102 | 130 | 10 | 40 | −0.284 | 15400 | −0.4 |
| Ex. 11 | 109 | 130 | 30 | 10 | −0.174 | 15200 | −0.2 |
| C. Ex. 1 | 11 | 180 | 10 | 40 | 0.017 | 15200 | 0.4 |
| C. Ex. 2 | 12 | 180 | 30 | 10 | 0.128 | 15000 | 0.8 |
| C. Ex. 3 | 48 | 180 | 5 | 10 | 0.041 | 15300 | 0.6 |
| C. Ex. 4 | 52 | 180 | 10 | 10 | 0.086 | 15200 | 0.7 |
| C. Ex. 5 | 57 | 160 | 30 | 10 | 0.078 | 15300 | 0.5 |
| C. Ex. 6 | 112 | 180 | 5 | 10 | 0.107 | 15100 | 0.9 |
| C. Ex. 7 | 101 | 160 | 10 | 40 | 0.017 | 15100 | 0.4 |
| C. Ex. 8 | 109 | 150 | 30 | 10 | 0.034 | 15200 | 0.5 |

Ex.: Example
C. Ex.: Comparative Example

TABLE 2

| | oxygen content $C_2$ (ppm) | water content $M_2$ (ppm) | temperature $T_2$ (° C.) | average residence time $\tau_2$ (hr) | powder keeping parameter $B_1$ | viscosity average molecular weight | b value |
|---|---|---|---|---|---|---|---|
| Ex. 12 | 10 | 48 | −10 | 12 | −0.183 | 15200 | −0.4 |
| Ex. 13 | 10 | 47 | 10 | 12 | −0.207 | 15200 | −0.5 |
| Ex. 14 | 10 | 45 | 10 | 120 | −0.024 | 15100 | −0.3 |
| Ex. 15 | 10 | 45 | 30 | 12 | −0.232 | 15300 | −0.5 |
| Ex. 16 | 10 | 48 | 30 | 120 | −0.047 | 15400 | −0.2 |
| Ex. 17 | 10 | 94 | −10 | 12 | −0.169 | 15300 | −0.5 |
| Ex. 18 | 10 | 97 | 10 | 12 | −0.192 | 15000 | −0.4 |
| Ex. 19 | 10 | 98 | 10 | 120 | −0.008 | 15400 | −0.2 |
| Ex. 20 | 10 | 94 | 30 | 12 | −0.217 | 15300 | −0.5 |
| Ex. 21 | 10 | 93 | 30 | 120 | −0.033 | 15200 | −0.3 |
| Ex. 22 | 10 | 476 | −10 | 12 | −0.136 | 15000 | −0.3 |
| Ex. 23 | 10 | 483 | 10 | 12 | −0.159 | 15100 | −0.5 |
| Ex. 24 | 10 | 491 | 30 | 12 | −0.183 | 15500 | −0.5 |
| Ex. 25 | 50 | 8 | −10 | 12 | −0.128 | 15200 | −0.4 |
| Ex. 26 | 50 | 8 | 30 | 12 | −0.176 | 15000 | −0.4 |
| Ex. 27 | 50 | 44 | −10 | 12 | −0.093 | 15100 | −0.4 |
| Ex. 28 | 50 | 48 | 30 | 12 | −0.139 | 15200 | −0.3 |
| Ex. 29 | 50 | 95 | −10 | 12 | −0.077 | 15100 | −0.2 |
| Ex. 30 | 50 | 92 | 30 | 12 | −0.126 | 14900 | −0.3 |
| Ex. 31 | 50 | 471 | −10 | 12 | −0.044 | 15500 | −0.4 |
| Ex. 32 | 50 | 474 | 30 | 12 | −0.092 | 15100 | −0.2 |
| Ex. 33 | 200 | 8 | −10 | 12 | −0.049 | 15500 | −0.2 |
| Ex. 34 | 200 | 7 | 30 | 12 | −0.099 | 15400 | −0.3 |
| Ex. 35 | 200 | 42 | −10 | 12 | −0.015 | 15200 | −0.3 |
| Ex. 36 | 200 | 46 | 30 | 12 | −0.061 | 15400 | −0.3 |
| Ex. 37 | 200 | 93 | 10 | 12 | −0.023 | 15200 | −0.1 |
| Ex. 38 | 200 | 97 | 30 | 12 | −0.046 | 15300 | −0.3 |
| Ex. 39 | 200 | 465 | 30 | 12 | −0.014 | 15500 | −0.2 |
| C. Ex. 9 | 10 | 49 | −10 | 120 | 0.001 | 15000 | 0.6 |
| C. Ex. 10 | 10 | 95 | −10 | 120 | 0.015 | 15200 | 0.8 |
| C. Ex. 11 | 10 | 470 | −10 | 96 | 0.007 | 14900 | 0.5 |
| C. Ex. 12 | 10 | 489 | 10 | 108 | 0.004 | 15300 | 0.4 |
| C. Ex. 13 | 10 | 499 | 30 | 132 | 0.021 | 15300 | 0.4 |
| C. Ex. 14 | 50 | 7 | −10 | 96 | 0.012 | 15100 | 1.0 |
| C. Ex. 15 | 50 | 9 | 30 | 120 | 0.010 | 15400 | 0.7 |
| C. Ex. 16 | 50 | 48 | −10 | 72 | 0.011 | 15500 | 0.9 |
| C. Ex. 17 | 50 | 46 | 30 | 96 | 0.003 | 15500 | 0.5 |
| C. Ex. 18 | 50 | 95 | −10 | 60 | 0.005 | 15000 | 0.5 |
| C. Ex. 19 | 50 | 91 | 30 | 96 | 0.017 | 15200 | 1.1 |
| C. Ex. 20 | 50 | 490 | −10 | 48 | 0.018 | 15200 | 0.9 |
| C. Ex. 21 | 50 | 499 | 30 | 72 | 0.011 | 15000 | 0.6 |
| C. Ex. 22 | 200 | 7 | −10 | 48 | 0.010 | 15200 | 1.0 |
| C. Ex. 23 | 200 | 9 | 30 | 72 | 0.008 | 15400 | 0.7 |
| C. Ex. 24 | 200 | 48 | −10 | 24 | 0.008 | 15100 | 0.5 |

TABLE 2-continued

|  | oxygen content $C_2$ (ppm) | water content $M_2$ (ppm) | temperature $T_2$ (° C.) | average residence time $\tau_2$ (hr) | powder keeping parameter $B_1$ | viscosity average molecular weight | b value |
|---|---|---|---|---|---|---|---|
| C. Ex. 25 | 200 | 49 | 30 | 48 | 0.001 | 14900 | 0.3 |
| C. Ex. 26 | 200 | 95 | 10 | 36 | 0.019 | 15200 | 0.8 |
| C. Ex. 27 | 200 | 91 | 30 | 48 | 0.014 | 15200 | 0.9 |
| C. Ex. 28 | 200 | 480 | 30 | 24 | 0.007 | 15400 | 0.6 |

Ex.: Example
C. Ex.: Comparative Example

TABLE 3

| | melt keeping of raw material mixture | | | | | melt keeping of carbonic acid diester | | | | | powder keeping of aromatic dihydroxy compound | | | | |
|---|---|---|---|---|---|---|---|---|---|---|---|---|---|---|---|
| | $C_0$ (ppm) | $T_0$ (° C.) | $U_0$ (° C.) | $\tau_0$ (hr) | $A_0$ | $C_1$ (ppm) | $T_1$ (° C.) | $U_1$ (° C.) | $\tau_1$ (hr) | $A_1$ | $C_2$ (ppm) | $M_2$ (ppm) | $T_2$ (° C.) | $\tau_2$ (hr) | $B_1$ |
| Ex. 40 | | | | | | | | | | | 10 | 47 | 10 | 12 | −0.207 |
| Ex. 41 | | | | | | 12 | 120 | 10 | 100 | −0.818 | | | | | |
| C. Ex. 29 | | | | | | 12 | 220 | 10 | 100 | 0.064 | | | | | |
| Ex. 42 | 12 | 130 | 5 | 10 | −0.541 | | | | | | 10 | 45 | 30 | 12 | −0.232 |
| Ex. 43 | 109 | 130 | 30 | 10 | −0.174 | | | | | | 10 | 45 | 30 | 12 | −0.232 |
| Ex. 44 | 12 | 130 | 5 | 10 | −0.541 | 12 | 120 | 10 | 100 | −0.818 | | | | | |
| Ex. 45 | 109 | 130 | 30 | 10 | −0.174 | 12 | 120 | 10 | 100 | −0.818 | | | | | |
| Ex. 46 | 12 | 130 | 5 | 10 | −0.541 | | | | | | | | | | |
| Ex. 47 | 109 | 130 | 30 | 10 | −0.174 | | | | | | | | | | |
| Ex. 48 | | | | | | 12 | 120 | 10 | 100 | −0.818 | 10 | 45 | 30 | 12 | −0.232 |
| Ex. 49 | | | | | | 12 | 120 | 10 | 100 | −0.818 | 200 | 465 | 30 | 12 | −0.014 |

| | powder keeping of carbonic acid diester | | | | | | |
|---|---|---|---|---|---|---|---|
| | $C_3$ (ppm) | $M_2$ (ppm) | $T_3$ (° C.) | $\tau_3$ (hr) | $B_2$ | viscosity average molecular weight | Col. b value |
| Ex. 40 | 10 | 44 | −10 | 12 | −0.184 | 15200 | −0.5 |
| Ex. 41 | | | | | | 15200 | −0.5 |
| C. Ex. 29 | | | | | | 15200 | 0.2 |
| Ex. 42 | | | | | | 15200 | −0.7 |
| Ex. 43 | | | | | | 15200 | −0.4 |
| Ex. 44 | | | | | | 15200 | −0.8 |
| Ex. 45 | | | | | | 15100 | −0.5 |
| Ex. 46 | 10 | 44 | −10 | 12 | −0.184 | 15100 | −0.7 |
| Ex. 47 | 10 | 44 | −10 | 12 | −0.184 | 15200 | −0.3 |
| Ex. 48 | | | | | | 15200 | −0.7 |
| Ex. 49 | | | | | | 15200 | −0.4 |

Ex.: Example
C. Ex.: Comparative Example

What is claimed is:

1. A method of keeping a mixture of an aromatic dihydroxy compound and a carbonic acid diester, comprising keeping a mixture consisting essentially of an aromatic dihydroxy compound and a carbonic acid diester in a molten state under the condition that the melt keeping parameter ($A_0$) defined by the following equation (1):

$$A_0 = -7.88 + 0.179 \times \log C_0 + 3.354 \times \log T_0 + 0.0078 \times U_0 + 0.0017\tau_0 \quad (1)$$

wherein $C_0$ is the content (ppm) of oxygen in the atmosphere of a storage tank, $T_0$ is the temperature (° C.) of the molten mixture in the storage tank, $U_0$ is a temperature difference (° C.) between the heating medium of the storage tank and the molten mixture, and $\tau_0$ is the average residence time (hr) of the molten mixture in the storage tank, is 0 or less.

2. The method of claim 1, wherein the mixture is a mixture containing substantially no ester exchange catalyst between the aromatic dihydroxy compound and the carbonic acid diester.

3. The method of claim 1, wherein the aromatic dihydroxy compound is 2,2-bis(4-hydroxyphenyl)propane.

4. The method of claim 1, wherein the carbonic acid diester is diphenyl carbonate.

5. The method of claim 1, wherein the mixture contains the aromatic dihydroxy compound and the carbonic acid diester in a molar ratio of 1:1 to 1:1.2 in this order.

6. The method of claim 1, wherein the mixture is kept in a molten state at a temperature higher than the crystallization temperature and lower than 300° C. when the temperature is falling.

7. The method of claim 1, wherein the melt keeping parameter ($A_0$) is in the range of −0.6 to −0.001.

8. The method of claim 1, wherein the keeping time is more than 2 hours.

9. A method of keeping a carbonic acid diester, which comprises keeping the carbonic acid diester in a molten state under the condition that the melt keeping parameter ($A_1$) defined by the following equation (2):

$$A_1 = -8.08 + 0.145 \times \log C_1 + 3.35 \times \log T_1 + 0.007 \times U_1 + 0.0007\tau_1 \quad (2)$$

wherein $C_1$ is the content (ppm) of oxygen in the atmosphere of a storage tank, $T_1$ is the temperature (° C.) of the carbonic acid diester in the storage tank, $U_1$ is a temperature difference (° C.) between the heating medium of the storage tank and the carbonic acid diester, and $\tau_1$ is the average residence time (hr) of the carbonic acid diester in the storage tank, is 0 or less.

10. The method of claim 9, wherein the carbonic acid diester is diphenyl carbonate.

11. The method of claim 9, wherein the melt keeping parameter ($A_1$) is in the range of −1.6 to −0.001.

12. A method of keeping an aromatic dihydroxy compound, which comprises keeping the aromatic dihydroxy compound in a powder state under the condition that the powder keeping parameter ($B_1$) defined by the following equation (4):

$$B_1 = -0.425 + 0.131 \times \log C_2 + 0.047 \times \log M_1 - 0.0012 \times T_2 + 0.0017\tau_2 \quad (4)$$

wherein $C_2$ is the content (ppm) of oxygen in the atmosphere of a storage tank, $M_1$ is the water content (ppm) of the aromatic dihydroxy compound in the storage tank, $T_2$ is the temperature (° C.) of the aromatic dihydroxy compound in the storage tank, and $\tau_2$ is the average residence time (hr) of the aromatic dihydroxy compound in the storage tank, is 0 or less.

13. The method of claim 12, wherein the aromatic dihydroxy compound is 2,2-bis(4-hydroxyphenyl)propane.

14. The method of claim 12, wherein the powder keeping parameter ($B_1$) is in the range of −0.7 to −0.0001.

15. A method of keeping a carbonic acid diester, which comprises keeping the carbonic acid diester in a powder state under the condition that the powder keeping parameter ($B_2$) defined by the following equation (3):

$$B_2 = -0.425 + 0.131 \times \log C_3 + 0.047 \times \log M_2 - 0.0012 T_3 + 0.0017 \times \tau_3 \quad (3)$$

wherein $C_3$ is the content (ppm) of oxygen in the atmosphere of a storage tank, $M_2$ is the water content (ppm) of the carbonic acid diester in the storage tank, $T_3$ is the temperature (° C.) of the carbonic acid diester in the storage tank, and $\tau_3$ is the average residence time (hr) of the carbonic acid diester in the storage tank, is 0 or less.

16. The method of claim 15, wherein the carbonic acid diester is diphenyl carbonate.

17. The method of claim 15, wherein the powder keeping parameter ($B_2$) is in the range of −0.7 to −0.0001.

18. The method of claim 1, wherein an aromatic dihydroxy compound kept by a method of keeping an aromatic dihydroxy compound is used as the aromatic dihydroxy compound, wherein the method of keeping an aromatic dihydroxy compound comprises keeping the aromatic dihydroxy compound in a powder state under the condition that the powder keeping parameter ($B_1$) defined by the following equation (4):

$$B_1 = -0.425 + 0.131 \times \log C_2 + 0.047 \times \log M_1 - 0.0012 \times T_2 + 0.0017\tau_2 \quad (4)$$

wherein $C_2$ is the content (ppm) of oxygen in the atmosphere of a storage tank, $M_1$ is the water content (ppm) of the aromatic dihydroxy compound in the storage tank, $T_2$ is the temperature (° C.) of the aromatic dihydroxy compound in the storage tank, and $\tau_2$ is the average residence time (hr) of the aromatic dihydroxy compound in the storage tank, is 0 or less.

19. The method of claim 1, wherein a carbonic acid diester kept by a method of keeping a carbonic acid diester is used as the carbonic acid diester, wherein the method of keeping a carbonic acid diester comprises keeping the carbonic acid diester in a molten state under the condition that the melt keeping parameter ($A_1$) defined by the following equation (2):

$$A_1 = -8.08 + 0.145 \times \log C_1 + 3.35 \times \log T_1 + 0.007 \times U_1 + 0.0007\tau_1 \quad (2)$$

wherein $C_1$ is the content (ppm) of oxygen in the atmosphere of a storage tank, $T_1$ is the temperature (° C.) of the carbonic acid diester in the storage tank, $U_1$ is a temperature difference (° C.) between the heating medium of the storage tank and the carbonic acid diester, and $\tau_1$ is the average residence time (hr) of the carbonic acid diester in the storage tank, is 0 or less.

20. The method of claim 1, wherein a carbonic acid diester kept by a method of keeping a carbonic acid diester is used as the carbonic acid diester, wherein the method of keeping a carbonic acid diester comprises keeping the carbonic acid diester in a powder state under the condition that the powder keeping parameter ($B_2$) defined by the following equation (3):

$$B_2 = -0.425 + 0.131 \times \log C_3 + 0.047 \times \log M_2 - 0.0012 T_3 + 0.0017 \times \tau_3 \quad (3)$$

wherein $C_3$ is the content (ppm) of oxygen in the atmosphere of a storage tank, $M_2$ is the water content (ppm) of the carbonic acid diester in the storage tank, $T_3$ is the temperature (° C.) of the carbonic acid diester in the storage tank, and $\tau_3$ is the average residence time (hr) of the carbonic acid diester in the storage tank, is 0 or less.

21. A method of producing an aromatic polycarbonate, comprising subjecting a molten mixture of an aromatic dihydroxy compound and a carbonic acid diester kept by the method of claim 1 to an ester exchange reaction in the presence of a catalyst comprising a nitrogen-containing basic compound and at least one compound selected from the group consisting of an alkali metal compound and an alkaline earth metal compound.

22. A method of producing an aromatic polycarbonate, comprising subjecting an aromatic dihydroxy compound kept by the method of claim 12 and a carbonic acid diester to an ester exchange reaction in the presence of a catalyst comprising a nitrogen-containing basic compound and at least one compound selected from the group consisting of an alkali metal compound and an alkaline earth metal compound.

23. The method of claim 22, wherein a carbonic acid diester kept by a method of keeping a carbonic acid diester is used as the carbonic acid diester, wherein the method of keeping a carbonic acid diester comprises keeping the carbonic acid diester in a molten state under the condition that the melt keeping parameter ($A_1$) defined by the following equation (2):

$$A_1 \times = 8.08 + 0.145 \times \log C_1 + 3.35 \times \log T_1 + 0.007 \times U_1 + 0.0007\tau_1 \quad (2)$$

wherein $C_1$ is the content (ppm) of oxygen in the atmosphere of a storage tank, $T_1$ is the temperature (° C.) of the carbonic acid diester in the storage tank, $U_1$ is a temperature difference (° C.) between the heating medium of the storage tank and the carbonic acid diester, and $\tau_1$ is the average residence time (hr) of the carbonic acid diester in the storage tank, is 0 or less.

24. The method of claim 22, wherein a carbonic acid diester kept by a method of keeping a carbonic acid diester is used as the carbonic acid diester, wherein the method of keeping a carbonic acid diester comprises keeping the carbonic acid diester in a powder state under the condition that the powder keeping parameter ($B_2$) defined by the following equation (3):

$$B_2 = -0.425 + 0.131 \times \log C_3 + 0.047 \times \log M_2 - 0.0012 T_3 + 0.0017 \times \tau_3 \quad (2)$$

wherein $C_3$ is the content (ppm) of oxygen in the atmosphere of a storage tank, $M_2$ is the water content (ppm) of the carbonic acid diester in the storage tank, $T_3$ is the temperature (° C.) of the carbonic acid diester in the storage tank, and $\tau_3$ is the average residence time (hr) of the carbonic acid diester in the storage tank, is 0 or less.

\* \* \* \* \*